(12) United States Patent
Mirzendehdel et al.

(10) Patent No.: US 11,669,661 B2
(45) Date of Patent: Jun. 6, 2023

(54) AUTOMATED DESIGN AND OPTIMIZATION FOR ACCESSIBILITY IN SUBTRACTIVE MANUFACTURING

(71) Applicant: Palo Alto Research Center Incorporated, Palo Alto, CA (US)

(72) Inventors: Amirmassoud Mirzendehdel, San Mateo, CA (US); Morad Behandish, Mountain View, CA (US); Saigopal Nelaturi, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 330 days.

(21) Appl. No.: 16/901,187

(22) Filed: Jun. 15, 2020

(65) Prior Publication Data
US 2021/0390229 A1 Dec. 16, 2021

(51) Int. Cl.
| | | |
|---|---|---|
| *G06F 30/23* | (2020.01) | |
| *B33Y 50/02* | (2015.01) | |
| *G06F 30/17* | (2020.01) | |
| *G05B 19/4099* | (2006.01) | |
| *G06F 111/04* | (2020.01) | |
| *G06F 119/18* | (2020.01) | |

(52) U.S. Cl.
CPC ............ *G06F 30/23* (2020.01); *B33Y 50/02* (2014.12); *G05B 19/4099* (2013.01); *G06F 30/17* (2020.01); *G05B 2219/32015* (2013.01); *G06F 2111/04* (2020.01); *G06F 2119/18* (2020.01)

(58) Field of Classification Search
CPC ...... G06F 30/23; G06F 30/17; G06F 2111/04; G06F 2119/18; B33Y 50/02; G05B 19/4099; G05B 2219/32015
See application file for complete search history.

(56) References Cited

U.S. PATENT DOCUMENTS

| | | |
|---|---|---|
| 5,651,098 A | 7/1997 | Inoue et al. |
| 9,747,394 B2 | 8/2017 | Nelaturi et al. |
| 10,359,764 B1 | 7/2019 | Nelaturi et al. |

(Continued)

FOREIGN PATENT DOCUMENTS

| | | |
|---|---|---|
| WO | 2018/130820 | 7/2018 |
| WO | 2020/097578 | 5/2020 |

OTHER PUBLICATIONS

Langelaar (Langelaar, M. (2019). Topology optimization for multi-axis machining. Computer Methods in Applied Mechanics and Engineering, 351, 226-252.) (Year: 2019).*

(Continued)

*Primary Examiner* — Bijan Mapar
(74) *Attorney, Agent, or Firm* — Mueting Raasch Group

(57) ABSTRACT

A representation of an initial design domain, at least one subtractive tool assembly, machine degrees of freedom, and a termination criterion are used to iteratively generate intermediate part designs by redistributing the material within the design domain. A measure of inaccessibility of exteriors of the intermediate part designs by the at least one subtractive manufacturing tool assembly are generated. The measure of inaccessibility is used to inform generation of an intermediate part design at a next iteration. The iterative algorithm is terminated when the termination criterion is satisfied, the result of the iterative algorithm being a part design accessible for subtractive manufacturing.

19 Claims, 26 Drawing Sheets

(56) References Cited

U.S. PATENT DOCUMENTS

| | | |
|---|---|---|
| 11,283,143 B2 | 3/2022 | Aston et al. |
| 2002/0147521 A1 | 10/2002 | Mok et al. |
| 2018/0345647 A1 | 12/2018 | Morris et al. |
| 2018/0349531 A1 | 12/2018 | Morris et al. |
| 2019/0204807 A1 | 7/2019 | Nelaturi et al. |
| 2020/0209832 A1 | 7/2020 | Behandish et al. |
| 2020/0316856 A1 | 10/2020 | Mojdeh et al. |
| 2020/0373642 A1 | 11/2020 | Aston et al. |
| 2021/0390229 A1 | 12/2021 | Mirzendehdel et al. |

OTHER PUBLICATIONS

Mirzendehdel et al., "Exploring feasible design spaces for heterogeneous constraints", arxiv.org/pdf/1907.0117, Jul. 10, 2019, 28 pages.

EP Search Report from EP Application No. 21175772.9 dated Nov. 8, 2021, 11 pages.

Liu et al., "Topology optimization for hybrid additive-subtractive manufacturing", Structural and Multidisciplinary Optimization, vol. 55, No. 4, Aug. 29, 2016, pp. 1281-1299.

Morris et al., "A subtractive manufacturing constraint for level set topology optimization", Axiv.org, Feb. 19, 2020, 24 pages.

Behandish et al., "Automated process planning for hybrid manufacturing", Computer-Aided Design 102, 2018, 115-127.

Harzheim et al., "A review of optimization of cast parts using topology optimization", Structural and multidisciplinary optimization 31, 5, 2006, 388-399.

Langelaar, "Topology optimization for multi-axis machining", Computer Methods in Applied Mechanics and Engineering, 2019.

Lysenko et al., "Group morphology with convolution algebras", In Proceedings of the 14th ACM symposium on solid and physical modeling. ACM, 11-22.

Mirzendehdel et al., "Topology Optimization with Accessibility Constraint for Multi-Axis Machining", Computer-Aided Design, vol. 122, May 2020.

Nelaturi et al., "Automatic spatial planning for machining operations", In 2015 IEEE International Conference on Automation Science and Engineering (CASE). IEEE, 677-682.

Sucan et al., "The Open Motion Planning Library", IEEE Robotics & Automation Magazine 19, 4 (Dec. 2012), 72-82.

Zhou et al., "Minimum length scale in topology optimization by geometric constraints", Computer Methods in Applied Mechanics and Engineering 293 (2015), 266-282.

European Patent Office Search Report; dated May 17, 2022; 9 pgs.

Non-Final Office Action; dated Aug. 12, 2022; 35 pages.

Das et al., "Optimum Part Build Orientation in Additive Manufacturing for Minimizing Part Errors and Support Structures", 43rd Proceedings of the North American Manufacturing Research Institution of SME, vol. 1, 2015, pp. 343-354.

Delfs et al., "Optimized Build Orientation of Additive Manufactured Parts for Improved Surface Quality and Build Time", Additive Manufacturing 12, 2016, pp. 314-330.

Mirzendehdel et al., "Topology Optimization with Accessibility Constraint for Multi-Axis Machining", Computer-Aided Design, 122, 2020, 9 pages.

Morgan et al., "Part Orientation Optimisation for the Additive Layer Manufacture of Metal Components", The International Journal of Advanced Manufacturing Technology, 86, 5-8, 2016, pp. 1679-1687.

Nelaturi et al., "Automatic Support Removal for Additive Manufacturing Post Processing," Arxiv.Org, Cornell University Library, 201 Olin Library Cornell University Ithaca, NY 14853; Apr. 27, 2019; 14 pgs.

Nezhad et al., "Pareto-Based Optimization of Part Orientation in Stereolithography", Proceedings of the Institution of Mechanical Engineers, Part B: Journal of Engineering Manufacture, 224, 10, 2010, pp. 1591-1598.

Pandey et al., "Optimal Part Deposition Orientation in FDM by Using Multicriteria Genetic Algorithm", International Journal of Production Research, 42, 19, 2004, pp. 4069-4089.

Paul et al., "Optimization of Layered Manufacturing Process for Reducing Form Errors with Minimal Support Structures", Journal of Manufacturing Systems, 36, 2015, pp. 231-243.

Umetani et al., "Cross-Sectional Structural Analysis for 3D Printing Optimization", SIGGRAPH Asia Technical Briefs, 2013, 1 page.

Vanek, J., Clever Support: Efficient Support Structure Generation for digital Fabrication—Vanek—2014—Computer Graphics Forum, Wiley Online Library, Retrieved from the Internet: URL:https://inlinelibrary.wiley.com/doi/10.1111/cgf.12437 [retrieved on May 6, 2022]: 17 pgs.

Zhao et al., "Determination of Optimal Build Orientation Based on Satisfactory Degree Theory for RPT", Ninth International Conference on Computer Aided Design and Computer Graphics, IEEE, 2005, 6 pages.

* cited by examiner $T \to R_1 T \to (R_1 T - R_1 k_1)$
Rotation +30°
around local
frame's origin
$T \to R_2 T \to (R_2 T - R_2 k_1)$
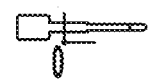
Rotation 0°
around local
frame's origin
$T \to R_3 T \to (R_3 T - R_3 k_1)$
Rotation -20°
around local
frame's origin
FIG. 3C
$T \to R_1 T \to (R_1 T - R_1 k_1)$
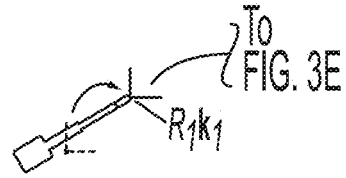
Translation
of local origin
to sharp point
$T \to R_2 T \to (R_2 T - R_2 k_1)$
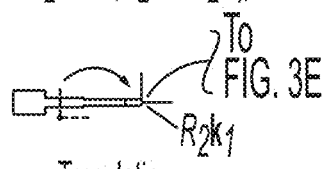
Translation
of local origin
to sharp point
$T \to R_3 T \to (R_3 T - R_3 k_1)$
Translation
of local origin
to sharp point
FIG. 3D

ΑΒΧΔΕΦΓΗΙϑΚΛΜΝΟΠΘΡΣΤΥςΩΞΨΖ
αβχδεφγηιφκλμνοπθρστυϖοξψζ

---

Algorithm 1 Compute $[\bar{f}_{IMF}], [^1\Gamma_{(o)}]$.

--- procedure IMF($[\rho_\Omega], [^1F], [^1H_i], [^1K_i], \{\Theta_i\}; \lambda, \eta_T$)

Define $[\rho_o] \leftarrow [\rho_\Omega] + [^1F]$     ▷ Implicit union

Initialize $[\bar{f}_{IMF}] \leftarrow 0$     ▷ IMF for all the tools for $i \leftarrow 1$ to $\eta_T$ do

Define $[^1T_i] \leftarrow [^1H_i] + [^1K_i]$     ▷ Implicit union

Initialize $[\gamma_i] \leftarrow [0]$     ▷ IMF for the $i^{th}$ tool for all $R \in \Theta_i$ do

$[^1_{RT_i}] \leftarrow$ ROTATE($[^1T_i], R$)     ▷ Re-sampling $[^1_{RT_i}] \leftarrow$ REFLECT($[^1_{RT_i}]$)

$[g_i] \leftarrow$ CONVOLVE($[\rho_o], [^1_{RT_i}]$)     ▷ FFT-based for all $k \in$ SUPPORT($[^1K_i]$) do

$[h_i] \leftarrow$ TRANSLATE($[g_i], -Rk$)

$[\gamma_i] \leftarrow$ min($[\gamma_i], [h_i]$)     ▷ Over sharp points end for end for

$[\bar{f}_{IMF}] \leftarrow$ min($[\bar{f}_{IMF}], [\gamma_i]$)     ▷ Over all tools end for

$[\bar{f}_{IMF}] \leftarrow [\bar{f}_{IMF}] /$ MAX($[\bar{f}_{IMF}]$)     ▷ Normalization $[^1B_{(o)}] \leftarrow [\bar{f}_{IMF} > \lambda]$ $[\bar{f}_{IMF}] \leftarrow [\bar{f}_{IMF}] \cdot [^1B_{(o)}]$     ▷ Add allowance $[^1\Gamma_{(o)}] \leftarrow [^1\Omega_o] \cdot [^{-1}\Omega] \cdot [^1B_{(o)}]$     ▷ Implicit intersect return ($[\bar{f}_{IMF}], [^1\Gamma_{(o)}]$)

end procedure

FIG. 5

Algorithm 2 TO with multi-axis machining constraint.

procedure TO ($[f]$, $V_{target}$, $[1_{H_i}]$, $[1_{K_j}]$, $\{\Theta_j\}$; $\lambda$, $\eta_T$, $\beta$, $\delta$, $\iota$)
    Initialize $[\xi_\Omega] \leftarrow [V_{target}/\text{INTERGRAL}([1_{\Omega_0}])]$
    Initialize $\Delta \leftarrow \infty$
    Initialize $iter \leftarrow 0$
    while $\Delta > \delta$ and $iter < \iota$ do
        $[\rho_\Omega] \leftarrow \text{HEAVISIDE}([\xi_\Omega], \beta)$     ▷ Projection
        $[u] \leftarrow \text{FEA}([\rho_\Omega], [f])$     ▷ Solve FEA
        $\varphi(\Omega) \leftarrow \text{EVALUATE}([\rho_\Omega], [u])$     ▷ Obj. func.
        $[\bar{S}_\varphi] \leftarrow \text{GRADIENT}([\rho_\Omega], [u], \varphi(\Omega))$     ▷ Sensitivity
        $[\rho_o] \leftarrow [\rho_\Omega] + [1_F]$     ▷ Implicit union
        $([\bar{f}_{IMF}], [1_{\Gamma(o)}]) \leftarrow \text{IMF}([\rho_\Omega], [1_F], ...; \lambda, \eta_T)$
            ▷ Call Algorithm 1 with obvious arguments
        $[\bar{S}_{IMF}] \leftarrow \text{PENALIZE}([\bar{f}_{IMF}], [1_{\Gamma(o)}])$     ▷ Eq. (26)
        $[S] \leftarrow (1 - w_{acc})[\bar{S}_\varphi] + w_{acc}[\bar{S}_{IMF}]$     ▷ Eq. (25)
        $[\xi_\Omega^{new}] \leftarrow \text{UPDATE}([\xi_\Omega], [S])$     ▷ SIMP filtering
        $\Delta \leftarrow \text{INTERGRATE}([\xi_\Omega^{new}] - [\xi_\Omega])$     ▷ Vol. diff.
        $iter \leftarrow iter + 1$     ▷ Iter. counter
        $[\xi_\Omega] \leftarrow [\xi_\Omega^{new}]$     ▷ For next iteration
    end while
    return $[\xi_\Omega]$
end procedure

FIG. 6

Thin cutter

Thick cutter

AUTOMATED DESIGN AND OPTIMIZATION FOR ACCESSIBILITY IN SUBTRACTIVE MANUFACTURING

This invention was made with government support under contract number HR0011-17-2-0030 awarded by DARPA. The government has certain rights in the invention.

SUMMARY

The present disclosure is directed to automated design and optimization for subtractive manufacturing while satisfying accessibility constraint with a given set of tools, fixtures, and available orientations. In one embodiment, a method and system provide a computer with a representation of: a design domain, at least one subtractive tool assembly, machine degrees of freedom, and a termination criterion. The system and method iteratively generate intermediate part designs by redistributing a material within the design domain. A measure of inaccessibility of exteriors of the intermediate part designs by the at least one subtractive manufacturing tool assembly is calculated. The measure of inaccessibility is used to inform generation of an intermediate part design at a next iteration. The iterative algorithm is terminated when the termination criterion is satisfied, the result of the iterative algorithm being a part design accessible for subtractive manufacturing via the at least one subtractive tool assembly.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

FIGS. 3A-3F are diagrams showing the determination of an inaccessibility measurement field for a part and tooling according to an example embodiment;

FIGS. 5 and 6 are pseudo-code listings of inaccessibility measure field computation and topology optimization according to example embodiments;

DETAILED DESCRIPTION

Figure 1A:
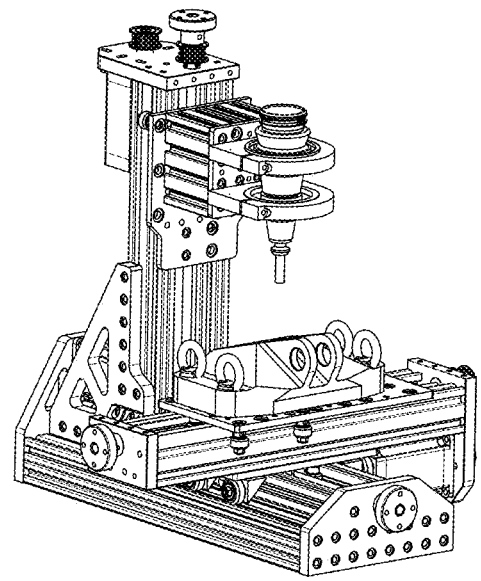
FIGS. 1A and 1B are perspective views of 3- and 5-axis machining setups according to example embodiments.

The present disclosure relates to a topology optimization (TO) framework to enable automated design of mechanical components while ensuring that the result can be manufactured using subtractive manufacturing (SM), e.g., multi-axis machining. In SM, one begins with a raw stock of material and gradually carves out material with a cutting tool until the desired shape emerges. Although TO is able to design parts with improved or optimized performance, the resulting as-designed model is often geometrically too complex to be machined, hence the as-manufactured model will significantly vary due to unsatisfied accessibility constraints. In other words, many of the optimized design features cannot be machined without causing a collision between the tool and the part or fixtures, which subsequently results in a costly trial-and-error process to make the design machinable with the given setup. The proposed approach is based on an accessibility analysis formulation using convolutions in configuration space. An 'inaccessibility measure field' (IMF) is defined over the design domain to identify the non-manufacturable features and quantify their inaccessibility in a spatially continuous manner. The IMF can then be coupled with the sensitivity field of performance objectives and constraints to prevent formation of inaccessible regions. The accessibility constraint formulation is applicable to parts, fixtures, and tools of arbitrary geometric complexity, and is highly parallelizable on multi-core architecture.

1. Introduction

Recent advances in computation and manufacturing technologies have enabled engineers to improve quality, increase productivity, and reduce cost by automating various stages of design and production. However, in many cases the discrepancies between as-design and as-manufactured models can result in an excessive trial-and-error cycle or even render the design completely non-manufacturable. By incorporating manufacturing constraints at the design stage, design workflows can be increasingly automated.

With the advances in computational hardware, material sciences, and manufacturing technologies, there is a great potential to navigate the expanded design space and introduce novel low-cost high-performance designs that can have multiple functionalities. Over the past few years, different automated design techniques such as topology optimization, machine learning, cellular automata, etc., have been developed that to varying degrees consider the physical performance of a part to generate non-trivial "organic" shapes.

One aspect of automated design includes the use of physics-based performance analysis such as finite elements, finite difference, and finite volume methods in computational solid mechanics or fluid dynamics, etc., to evaluate objective functions and constraints that depend on physical behavior and performance of deployed designs. Optimization algorithms can automatically optimize designs by iteratively changing the decision variables and gauging the effects on the performance using the said solvers, guided by sensitivity/gradients of the objective functions and constraints to the decision variables. Design and manufacturing constraints can be used to augment/filter decision variables based to incorporate design and manufacturing considerations in addition to the physical behavior and performance. One automated design technique that will be discussed in detail below is topology optimization.

Topology optimization (TO) is a computational automated design tool that enables engineers across multiple disciplines from biomedical to automotive and aerospace to explore the expansive design space of functional components. The interest in TO stems from recent advances in computational capabilities, new materials, and manufacturing technologies. Multi-functional components can be optimized to a high resolution while using high-fidelity simulation tools to generate geometrically complex and organic shapes that reduce cost while improving performance. For example, recent advances in additive manufacturing (AM) have enabled engineers to produce highly complex parts generated by TO. However, many industrial parts may still require adhering to strict tolerance and surface quality specifications that today can only be achieved by well-established subtractive manufacturing (SM) technologies, e.g., multi-axis machining utilizing computer numerical control (CNC).

Current advances in automated manufacturing technologies have also enabled the so-called hybrid manufacturing (HM) processes that combine the complementary capabilities of AM and SM to achieve customization, cost-effectiveness, geometric complexity, surface precision, and real-world functionality. An HM machine may be able to switch between deposition heads for AM and cutting tools for SM. Different AM and SM technologies have been combined using the same CNC motion systems for manufacturing and repair of metal parts, e.g., selective laser cladding (SLC) and mill-turn machining, direct metal laser sintering (DMLS) and precision milling, laser-based directed energy deposition and CNC. Versatility of HM processes in fabricating high-quality cost-effective parts comes at an increased complexity cost. In other words, the multi-modality of HM in combining additive and subtractive operations introduces new challenges in design and manufacturing planning.

Figure 1B:
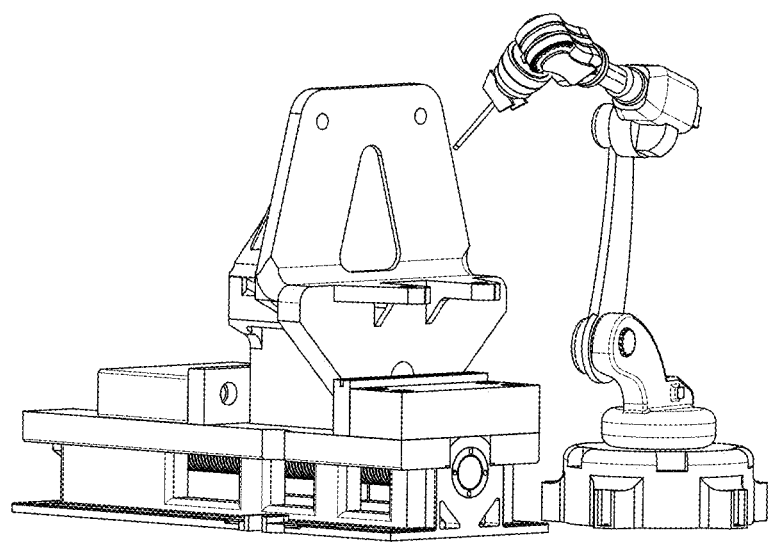
Figure 1D:
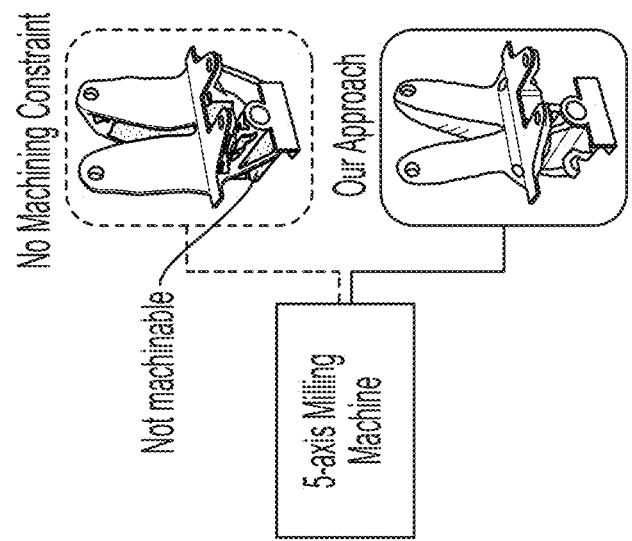
FIGS. 1C and 1D are comparisons of the optimized design without and with accessibility constraint for the setups of FIGS. 1A and 1B, respectively, showing that traditional design and optimization methods fail to generate machinable shapes.
Figure 1C:
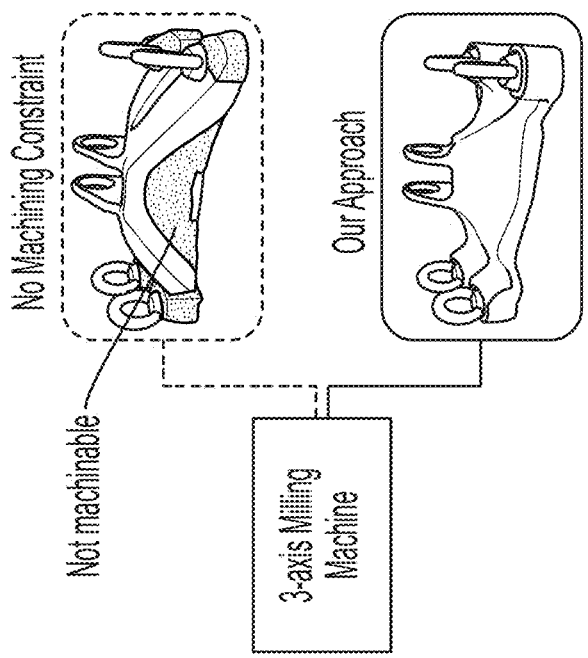

One aspect of this disclosure is development of a TO framework based on sound mathematical concepts to incorporate multi-axis accessibility constraints for machining in early stages of design. The method substantially reduces the time and resources spent on post-optimization trial-and-error by bridging the gap between design and a widely-used set of manufacturing processes. The effectiveness of the framework is demonstrated by considering realistic examples for 3-axis and 5-axis milling setups as shown in FIGS. 1A and 1B. In FIGS. 1C and 1D, example part geometries are shown that were generated by the TO framework using constraints for respective 3-axis and 5-axis milling machines.

This disclosure describes incorporation of accessibility constraints in TO. These types of constraints are typically expressed as 'set constraints' and are expressed in terms of containment, interference, affine transformations, and Boolean operations rather than the typical real-valued functions used for (in)equality constraints in TO.

This disclosure relates to a TO methodology to ensure manufacturability through subtractive and hybrid processes in terms of 'accessibility' of every point of design given a 'set' of cutting tool assemblies and fixturing orientations without imposing any artificial constraints on geometric complexity of part, tools, and fixturing devices. The approach enables efficient and effective design space exploration by finding nontrivial complex designs that can also be fabricated using the well-established subtractive machines or hybrid processes. In the sections below, a mathematical measure for inaccessibility is described that can be used to iteratively modify the sensitivity field of a topology-optimized design. A TO formulation is described that incorporates SM tool constraints based on realistic tools, multiple orientations and geometrically complex fixturing devices. The general and computationally efficient multi-axis machining constraint are applied to density-based TO. The effectiveness of the proposed method can be demonstrated by solving multiple benchmark and industrial examples.

2. Proposed Method

This section will discuss an analytic approach to accessibility analysis and introduce a continuous field to measure inaccessibility of a part with respect to a collection of tools and fixtures at a discrete set of fixturing orientations (Section 2.1). Next, the TO formulation for incorporating multi-axis machining constraint is extended into the density-based TO framework (Section 2.2).

2.1. Quantifying Multi-Axis Inaccessibility

TO typically starts with an initial design $\Omega = \Omega_0 \subset \mathbb{R}^3$ (called the design domain) and incrementally updates the design $\Omega \subseteq \Omega_0$ such that it remains within the design domain while minimizing the specified objective function and satisfying the specified constraints. These constraints may include performance criteria (e.g., stiffness or strength), evaluated by a physics solver such as FEA, as well as kinematic constraints (e.g., machine tool accessibility), which require spatial analysis. While the former is represented by (in)equality constraints in terms of real-valued functions, the latter is most naturally expressed using a set-theoretic language in terms of containment, interference, affine transformations, and Boolean operations. The following is an analytic approach to convert the latter to (in)equality form to be used alongside the former.

On a multi-axis CNC machine, one deals with 6D rigid motions $(R, t) \in SE(3)$, which are conceptualized as points in the configuration space (C-space) $SE(3)$, which is a pair formed by an special orthogonal (SO) automorphism of $\mathbb{R}^3$ (a 3D rotation) $R \in SO(3)$ and a vector (a 3D translation) $t \in \mathbb{R}^3$. For 2- or 3-axis milling, the rotation component is fixed at a finite set of fixturing orientations, while the tool is swept along a continuum set of 2D or 3D translations. For 5-axis milling, there are two additional DOF for rotations, since the rotation around the tool axis is redundant.

The rapidly turning tool profile is typically modeled by its axisymmetric closure around the spindle axis (e.g., a flat/ball-end cylinder) rather than explicitly accounting for the rotation in-space. The discrete fixturing orientations or continuum rotation DOF can be parameterized in a number of different ways, e.g., 3×3 orthogonal matrices, axis-angle pairs, unit quaternions, and Euler angles, or can be combined with the translational element to form unified representations such as 4×4 homogeneous matrices, dual quaternions, screws, etc. Each have their own pros and cons, which are well-understood. This formulation is not restricted to a specific parameterization of SO(3). In practice, the workspace of the CNC machine is a bounded subset of SE(3) which is digitized into a discrete set (i.e., finite sample) in accordance with the machine's precision and required algorithmic accuracy.

For spatial planning, the obstacles O: $=(\Omega \cup F)$ include the part/workpiece $\Omega \in \mathbb{R}^3$ (evolving portion via TO) and the fixtures $F \in \mathbb{R}^3$ (fixed portion), both of which are 3D pointsets represented in the same global coordinate frame. The tool assembly $T=(H \cup K)$ includes the tool holder $H \in \mathbb{R}^3$ (inactive portion) and the cutter $K \in \mathbb{R}^3$ (active portion) represented in the same local coordinate frame, which is transformed by the relative rigid transformation $(R, t) \in SE(3)$ with respect to the global coordinate frame of stationary obstacles. In reality, both workpiece and tool assembly may move. Since accessibility depends only on relative motion, it may be assumed the former to be stationary without loss of generality.

Assuming that the raw stock is the same as the design domain $\Omega_0$, the accessibility constraint can be formulated as follows: for every point on the part's exterior within the raw stock (i.e., the negative space) $(\Omega_0 - \Omega)$, there must exist a transformation $(R,) \in 3$ that brings at least one point on the cutter (hereon called a sharp point)$\in K$ in contact with the query point, without incurring a volumetric collision between the objects in relative motion:

$$\forall x \in (\Omega_0 - \Omega): \exists (R,t) \in SE(3) \text{ and } \exists k \in K$$

$$\text{s.t. } x=(R,t)k=Rk+t \text{ and } O \cap^* (R,t)T=\Pi \quad (1)$$

where the asterisk in $\cap^*$ stands for regularization after intersection. Touching only at the boundaries does not count as a collision, thus would not violate the above condition. $(R, t)T=RT+t$ stands for the transformed tool assembly (rotation before translation).

2.1.1 Morphological Definition of Accessibility

The accessibility is commonly formulated in terms of the configuration space obstacle (C-obstacle) of relative transformations. The C-obstacle is defined as the set of all transformations that result in a collision, violating Eq. (1):

$$\mathcal{O} := \{(R,t) \in SE(3) | O \cap (R,t)T \neq \Pi\}. \quad (2)$$

The accessible region $A \subseteq \Omega_0$, defined by the set of all points in the design domain that satisfy Eq (1), can be computed by sweeping (e.g., morphological dilation) of the cutter along the maximal collision-free motion. The latter is obtained as the complement of C-obstacle in the C space (the 'free space') $\mathcal{O}^c = SE(3) - \mathcal{O}$, hence:

$$A(O, T, K) := \Omega_0 \cap \text{sweep}(\mathcal{O}^c, K) \quad (3)$$

$$= \Omega_0 \cap \bigcup_{(R,t) \in \mathcal{O}^c} (RK + t). \quad (4)$$

Both sweeps and C-obstacles can be expressed in terms of Minkowski products in C-space, and, in turn, as unions of the more familiar Minkowski sums in $\mathbb{R}^3$ if the rotations are factored out as follows:

$$A(O,T,K) = \Omega_0 \cap \bigcup_{R \in SO(3)} (O \oplus (-RT))^c \oplus (RK), \quad (5)$$

in which $\oplus, \ominus, (\cdot)^c$ are the Minkwoski sum, Minkowski difference, and set complement, respectively. For a given orientation $R \in SO(3)$, the first sum D: $=O \oplus (-RT)$ is a translational "slice" of the C-obstacle, whose complement $D^c$ is the collection of all collision-free translations (a slice of OC for a fixed rotation). The second sum $D^c \oplus (RK)$ represents the accessible region for the same orientation, obtained by sweeping the rotated cutter RK along the maximal collision-free translation $D^c$. The inaccessible region $B \subseteq \Omega_0$ is the set of points in the raw stock that do not belong in A:

$$B(O,T,K): =\Omega_0 - A(O,T,K). \quad (6)$$

To convert the global set-theoretic definition of accessibility to a local (in)equality constraint, we use the correspondence between Minkowski and convolution algebras for explicit and implicit morphology, respectively. The indicator function of any pointset $X \subseteq \mathbb{C}^3$ is a binary-valued field denoted by $\mathbf{1}_X: \mathbb{R}^3 \to \{0,1\}$ defined as:

$$\mathbf{1}_X(x) = \begin{cases} 1 & \text{if } x \in X; \\ 0 & \text{otherwise.} \end{cases} \text{ for any } X \subseteq \mathbb{R}^3. \quad (7)$$

Under fairly general regularity conditions (e.g., if the participating sets are homogeneously 3D, e.g., the free space has no singularities, which is sufficient for these purposes), we have:

$$\mathbf{1}_D(t) = \text{sign} \circ (\mathbf{1}_O * \tilde{\mathbf{1}}_{RT})(t), \quad (8)$$

$$\mathbf{1}_A(x) = \text{sign} \circ (\neg \mathbf{1}_D * \mathbf{1}_{RK})(x), \quad (9)$$

where * stands for the convolution operator defined for integrable fields over $\mathbb{R}^3$, and $\mathbf{1}_{D^c}(t) = \neg \mathbf{1}_D(t)$ where $\neg$ stands for logical negation. We introduce the notation $\tilde{\mathbf{1}}_X(x) = \mathbf{1}_{-X}(x) = \mathbf{1}_X(-x)$ for reflection with respect to the origin, which is needed to match how convolutions are defined to attain their useful properties. The sign function is defined as $\text{sign}(x)=x/|x|$ if $x \neq 0$ and zero otherwise, and is required for algebraic closure—to convert the real-valued convolution to a binary-valued indicator function before passing it to the next convolution.

Figure 2B:
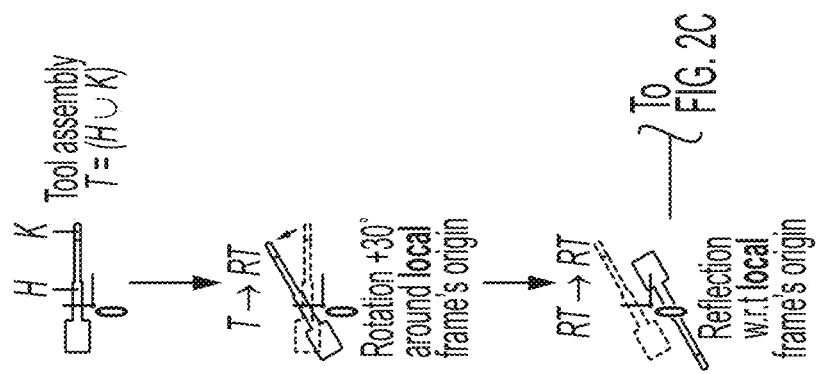
FIGS. 2A-2E are diagrams illustrating explicit and implicit manufacturing operations in two dimensions according to an example embodiment.
Figure 2A:
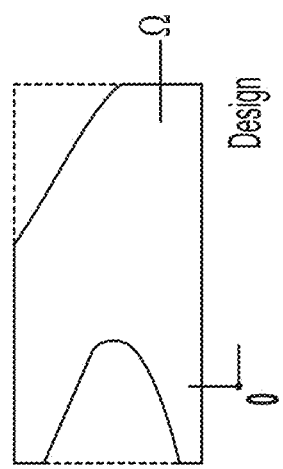
Figure 2C:
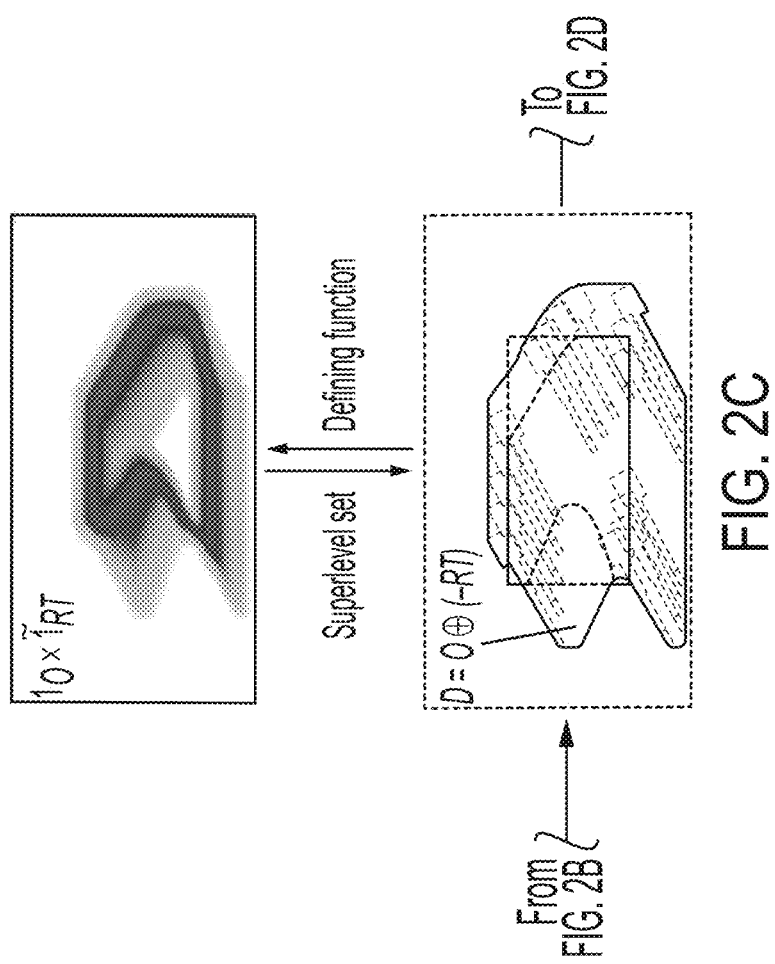
Figure 2E:
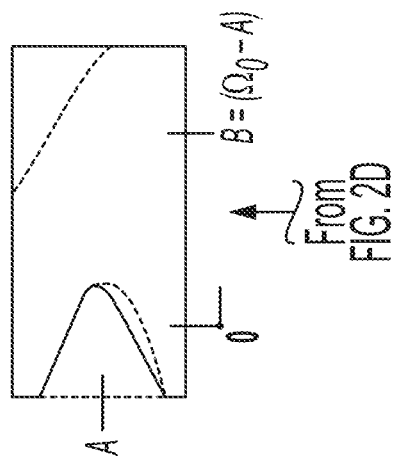
Figure 2D:
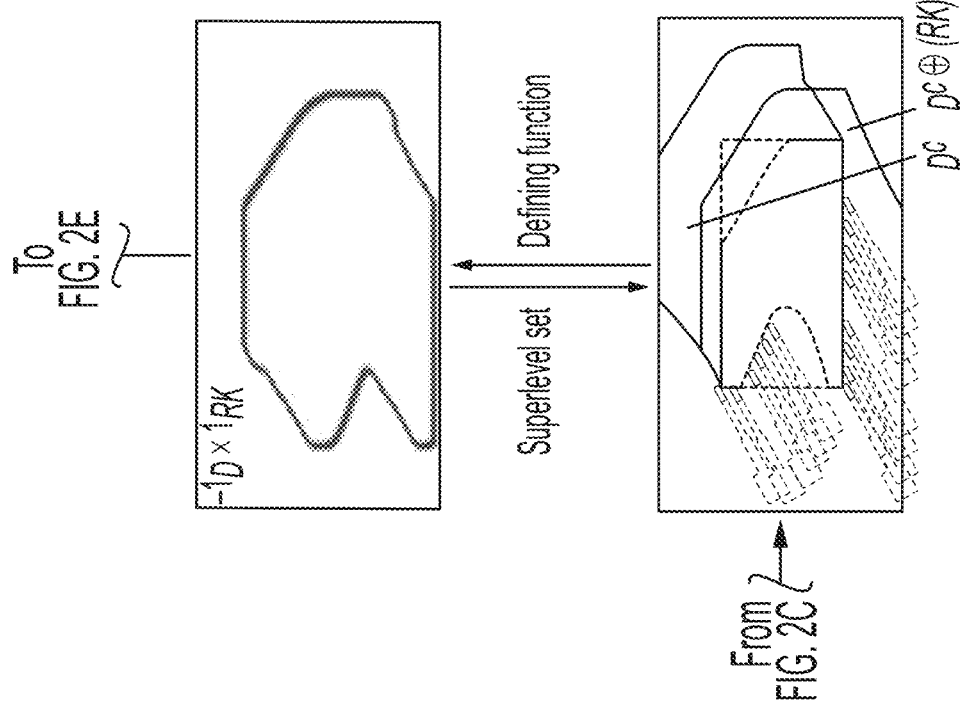

In FIGS. 2A-2D, diagrams illustrate both explicit and implicit operations in 2D. Consider in FIG. 2A a 2D part $O=\Omega$ (here $F=\emptyset$) and in FIG. 2B a 2D tool assembly $T=(H \cup K)$. The tool is re-oriented as $T \to RT$ for a given $R \in 2$ and reflected as $RT \to -RT$. As shown in FIG. 2C, the Minkowski sum $D=O \oplus (-RT)$ gives the set of colliding translations for the fixed rotation, which can be obtained as 0-superlevel set of a convolution $(\mathbf{1}_D * \tilde{\mathbf{1}}_{RT})$. As shown in FIG. 2D, the Minkowski sum $D^c \oplus (RK)$ gives the accessible region as the sweep of the cutter along collision-free translations, which can be obtained as 0-superlevel set of a convolution $(\neg \mathbf{1}_D * \mathbf{1}_{RK})$ The decomposition into accessible A and inaccessible B regions is shown in FIG. 2E.

While the indicator functions are useful for accessibility analysis as a post-TO test, we need a spatial field to penalize inaccessibility of different points within the candidate design $\Omega \subseteq \Omega_0$ to prevent the TO from violating accessibility at every iteration.

2.1.2 Inaccessibility Measure as Convolution

The no-collision condition in Eq. (1) can also be expressed in terms of the measure of intersection:

$$O \cap^* (R,t)T = \Pi \rightleftharpoons \text{vol}[O \cap (R,t)T]=0, \quad (10)$$

Where vol[·] stands for volume (specifically, Lebesgue 3-measure) of a 3D pointset. This measure can be computed as an inner product of indicator functions, by integration of their product over $\mathbb{R}^3$. For objects in relative motion, the translational component results in a shift of function argument, turning the inner product into a convolution, as shown below which also appeared on the right-hand side of Eq. (8).

$$\text{vol}[O \cap (R,t)T] = \langle 1_O, 1_{(R,t)T} \rangle = (1_O * \tilde{1}_{RT})(t), \quad (11)$$

At a first glance, the convolution field appears like an ideal candidate for penalization in TO: a continuous field over $\mathbb{R}^3$ that measures inaccessibility. At a closer look, however, the domain of this function is the translational C-space, which is a different "type" than the design domain. The former is a space of 3D displacement vectors (position differences) while the latter is of 3D points (positions). The convolution function measures the inaccessibility for a hypothetical displacement of $t \in \mathbb{R}^3$ that has nothing to do with any point $x \in \Omega_0$. The function shifts with different choices of origin for the local coordinate system in which the tool assembly is described.

To properly "register" the shifted field with the design domain, we must select the origin at the sharp points so that the convolution $(1_O * \tilde{1}_{RT})(t)$ evaluated at the translation $t \in \mathbb{R}^3$ returns the collision measure for shifting the sharp point from the origin 0 to $x = (R, t)0 = R0 + t = t$. Since we have more than one option for the sharp point, each one provides an independent candidate for the origin to register the two spaces by shifting the convolution.

2.1.3 Inaccessibility for a Single Tool Assembly

We define the inaccessibility measure field (IMF) over the 3D design domain $f_{IMF}: \mathbb{R}^3 \to \mathbb{R}$ for each given tool assembly $T = (H \cup K)$ as the pointwise minimum of shifted convolutions for different choices of sharp points and available orientations $\Theta \subseteq g\, SO(3)$ (which depends on T):

$$f_{IMF}(x; O, T, K) := \min_{R \in \Theta} \min_{\in K} \text{vol}[O \cap (R, x)(T - k)]. \quad (12)$$

There are two independent transformations in effect. First, the shift $T \to (T-k)$ in Eq. (12) is to try different ways to register the translation space with the design domain, by changing the local coordinate system to bring different sharp points to the origin. The second transformation is the rotation $(T-k) \to (RT-Rk)$ followed by translation $(RT-Rk) \to (RT-Rk)+x$ bring the candidate sharp point (new origin) to the query point $x \in \Omega_0$.

The same effect can be obtained by querying the convolution in Eq (11) at $t := (x-Rk)$ so that the rigid transformation $(R, t)$ brings the sharp point in contact with the query point: $(R, t)k = Rk + t = Rk + (x-Rk) = x$, as expected. The IMF is thus computed as follows:

$$f_{IMF}(x; O, T, K) = \min_{R \in \Theta} \min_{k \in K} (1_O * \tilde{1}_{RT})(x - Rk). \quad (13)$$

Each transformed convolution measures the collision for an attempt to remove the query point $x \in \Omega_0$ in the candidate orientation $R \in \Theta$ with the sharp point $k \in K$. The inaccessibility of the query point is determined by the orientation and sharp point that result in the best case scenario, e.g., the least collision volume.

Figure 3A:
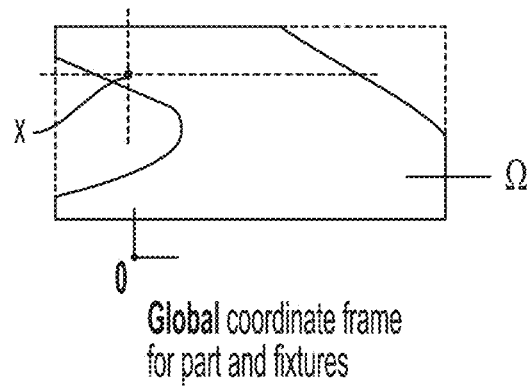
Figure 3B:
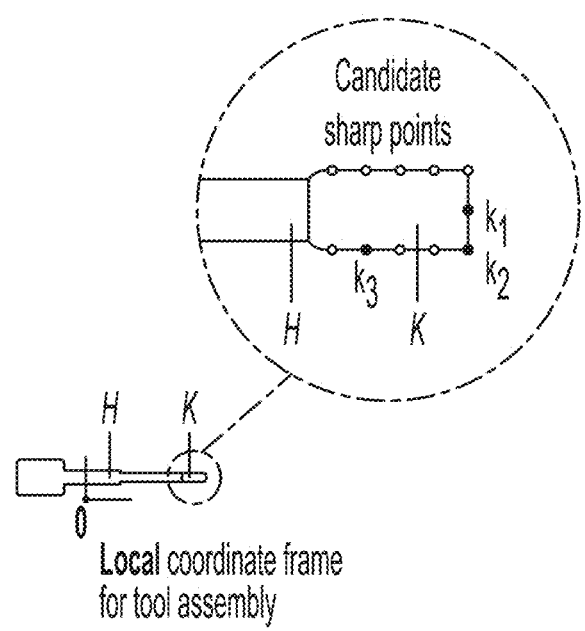
Figure 3E:
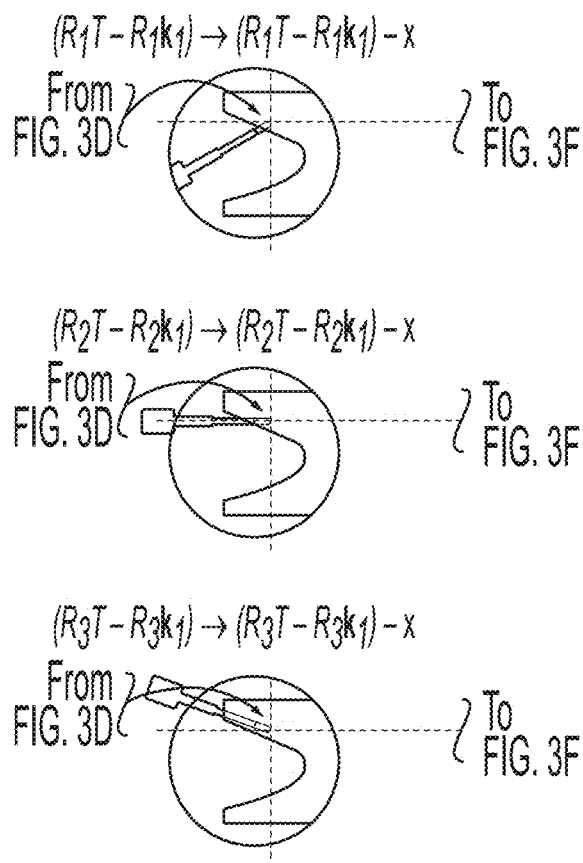
Figure 3F:
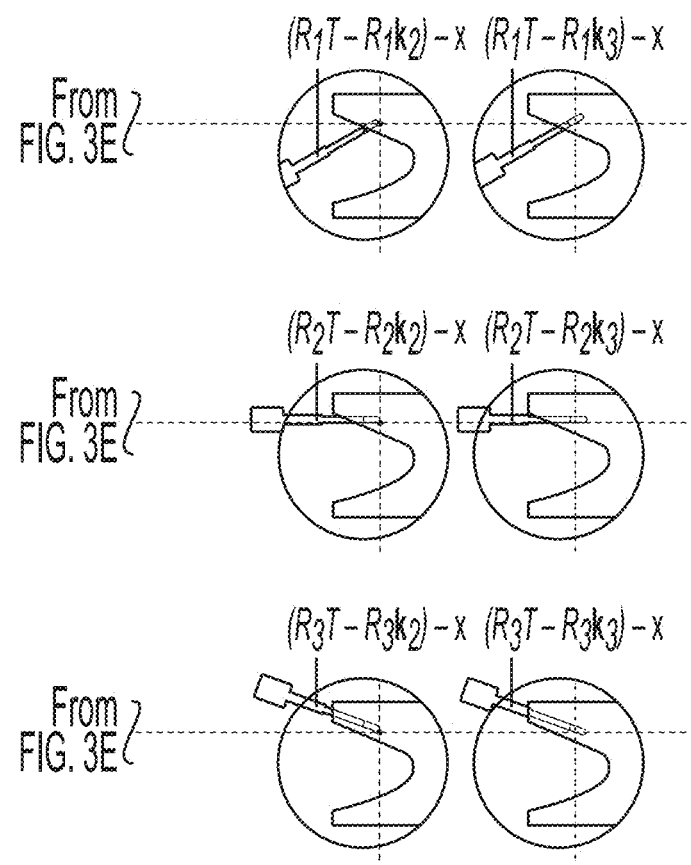

The diagrams in FIGS. 3A-3F illustrate the idea behind Eq. (13) for simple 2D shapes with a few candidate orientations and sharp points. FIG. 3A shows a 2D part and FIG. 3B shows a 2D tool assembly. At a given query point $\in \Omega_0$, the IMF is computed by looking at different rotations $R_1, R_2,$ $R_3, \ldots \in \Theta$ of the tool assembly, three of which are shown in FIG. 3C. For each oriented tool $T \to R_i T$, the origin is shifted to different sharp points $k_1, k_2, k_3, \ldots \in K$; e.g., for the (rotated) sharp point $R_i k_j \in R_i K$, the tool is translated as $R_i T \to (R_i T - R_{ij})$ shown in FIG. 3C. The new origin is brought in contact with the query point, hence $(R_i T - R_i k_j) \to (R_i T \to R_i k_j) \times$ shown in FIG. 3E. This is repeated for all candidate sharp points as in FIG. 3F and the IMF is computed as the minimum over all rotations and sharp points. Note that the collision measure accounts for both: 1) penetrations of the cutter into the local neighborhood of the part (often referred to as "gouging") or fixtures, which leads to over-cutting; and 2) global interferences that may occur elsewhere along the tool holder.

The IMF can be used to classify the design domain into disjoint subsets A: $f_{IMF}^{-1}(0)$, and $B = \Omega_0 - A$:

$$A(O,T,K) := \{x \in \Omega_0 | f_{IMF}(x; O, T, K) = 0\},$$

$$B(O,T,K) := \{x \in \Omega_0 | f_{IMF}(x; O, T, K) > 0\}.$$

which are the same as the pointsets defined in Eqs. (4) and (6) if $\Theta := SO(3)$, under quite general conditions. A query point is accessible iff its IMF is zero, namely that there exists one or more tool orientations and sharp points with which the query point can be touched without incurring a collision.

Figure 4:
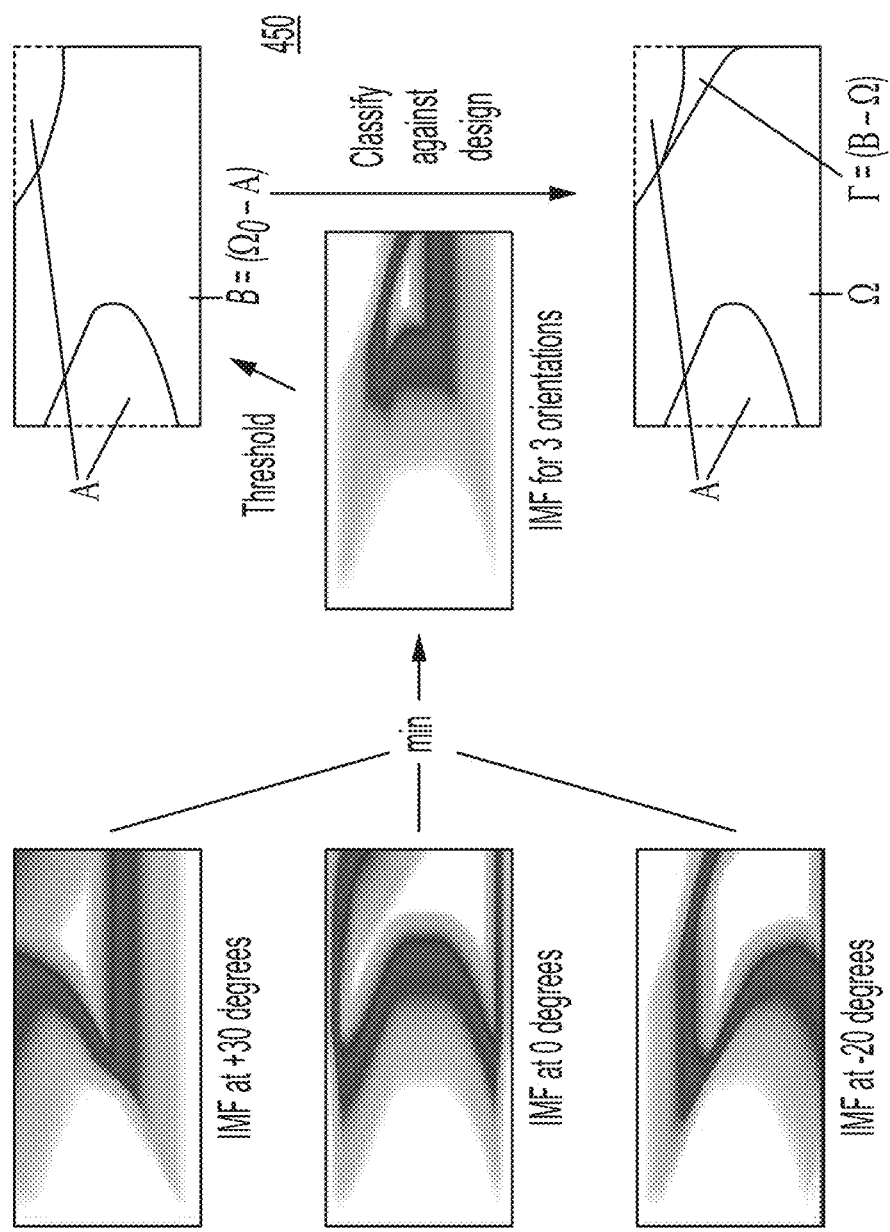
FIG. 4 is a diagram showing decomposition of inaccessibility measurement field for three orientations according to an example embodiment.

Note that every point inside the design itself is inaccessible, such that $\Omega \subseteq$ S B thus $(\Omega \cap A) = \Pi$. Hence, the inaccessible region can be further decomposed into two disjoint subsets, the part $\Omega$ and $\Gamma := (B - \Omega)$, to which we refer as the 'secluded region'. The latter is the set of all points in the negative space $(\Omega_0 - \Omega)$ of the part/workpiece that are inaccessible, such as points in the raw stock that cannot be machined at any orientation with the given tool using the specified options for sharp points. The diagram in FIG. 4 illustrates this three-way decomposition for a 2D example. For every candidate orientation in FIG. 4, the minimum of convolution over all sharp points is computed. The overall IMF is obtained as another minimum over all orientations, whose zero/nonzero values determine accessible/inaccessible regions. For parts designed for machining, TO must resist generating secluded regions, including nucleation of internal voids inside the part, which are often seen in TO parts meant for AM.

2.1.4 Inaccessibility for Multiple Tool Assemblies

Given $n_T \geq 1$ available tool assemblies $T_i = (H_i \cup K_i)$ for $1 \leq i \leq n_T$, we compute their combined IMF by applying another minimum operation over different tools to identify the tool(s) with the smallest volumetric interference at available orientations and sharp points:

$$f_{IMF}(x; O) := \min_{1 \leq i \leq n_T} f_{IMF}(x; O, T_i, K_i) \quad (14)$$

in which $f_{IMF}(x; O, T_i, K_i)$ are computed from Eq. (13). Once again, we can decompose the design domain into accessible and inaccessible regions, respectively, with respect to all available tool assemblies:

$$A(O) := \otimes_{1 \leq i \leq n_T}(O, T_i, K_i), \quad (15)$$

$$B(O) := \cap_{1 \leq i \leq n_T} B(O, T_i, K_i). \quad (16)$$

in which $A(O, T_i, K_i)$ and $B(O, T_i, K_i)$ were obtained earlier. The secluded region with respect to all tools is the subset of inaccessible regions that lies outside the design:

$$\Gamma(O) := B(O) \cap (\Omega_0 - \Omega) = B(O) - \Omega. \quad (17)$$

2.1.5 Algorithm to Support Density-Based TO

In density-based TO, one deals with a continuous density function $\rho_\Omega: \Omega \to [0,1]$ to represent intermediate designs, rather than indicator functions. While we can use a threshold $0 < \tau < 1$ (e.g., $\tau := 0.5$) to define the indicator functions as $1_\Omega(x) := 1$ iff $\rho_\Omega(x) > \tau$ for use in Eq. (13), our experience shows that direct use of the density function works better to provide additional smoothing:

$$f_{IMF}(x; \rho_o, T, K) := \min_{R \in \Theta} \min_{k \in K} (\rho_o * \tilde{1}_{RT})(x - Rk). \quad (18)$$

The function $\rho_O: \Omega_0 \to [0,1]$ can be obtained as: $\rho_O(x) := \rho_\Omega(x) + 1_F(x)$, in which $\rho_\Omega(x)$ is obtained directly from TO. The combined IMF for all tool assemblies $f_{IMF}(x; \rho_O)$ is computed as:

$$f_{IMF}(x; \rho_o) := \min_{1 \leq i \leq n_T} f_{IMF}(x; \rho_o, T_i, K_i) \quad (19)$$

The IMF is in units of volume. To use it alongside other constraints in TO (e.g., stiffness and strength) we first normalize it by the global maximum to obtain $\tilde{f}_{IMF}(x; \rho_O)$. Moreover, to deal with inaccuracies due to discretization and intermediate densities in TO, we allow for some relaxation, aiming for a small allowance of $0 < \lambda \ll 1$ (e.g., $\lambda := 0.01$) for nonzero inaccessibility. In other words, we only penalize the points that have (normalized) inaccessibility value of greater than the threshold A.

For the sake of generality, we assume that a given tool assembly $T_i$ comes with a given set of rotations $\Theta_i \subset SO(3)$ available for orienting that tool. For 3-axis milling, the set of available rotations is finite, corresponding to different fixturing configurations. For 5-axis milling, we can assume a continuum set of rotations, which can be sampled for computational purposes.

In practice, the shape of fixtures F hence $O = (\Omega \cup F)$ can change every time the part is rotated and re-clamped for 3-axis milling at a different orientation. For clarity, we do not consider multiple fixtures in this paper, although accounting for their changing shapes comes at no extra cost as long as the fixturing setup is given a priori.

In FIG. 5, Algorithm 1 describes the subroutine that computes the IMF for a given candidate design and a specified set of tool assemblies, orientations, and fixtures for use within TO iterations. For every tool assembly represented by a 3D array $[1_{T_i}]$ of binary values (e.g., voxels) and a given orientation $R \in \Theta_i$ represented by a unit quaternion, the 3D array $[\tilde{1}_{RT_i}]$ is obtained by rotation and re-sampling on the uniform grid, followed by a reflection with respect to the origin. The reflection is conveniently implemented as a conjugation in the frequency domain after FFT (Hermitian symmetry). The discretized convolution is represented as a 3D array $[\rho_O * \tilde{1}_{RT_i}]$ and is computed by two forward FFTs on $[\rho_O]$ and $[\tilde{1}_{RT_i}]$, a pointwise multiplication in the frequency domain, and an inverse FFT back to the physical domain (of translations). This is repeated for all tools and orientations to obtain the minimums in Eq. (18).

Our formulation in terms of sharp points allows immense flexibility for balancing accuracy against computation time. As the cutter's boundary is sampled more densely, the IMF can only decrease in value due to the minimum operation in Eq. (13), and the set of secluded points $\Gamma(O)$ grows in size. This comes at a small cost of more queries on the convolution. Importantly, coarser sampling of the cutter can only over-estimate the exact IMF, leading to a conservative approximation of inaccessibility. As more sharp points are sampled on the cutter, more candidate designs are deemed machinable by carving out their negative spaces via the same sample points. Omitting other sharp points can over-constrain the TO by "false positives" in collision detection, i.e., obtaining $f_{IMF}(x; \Omega) > 0$ while the true value is zero; however, the approximation never violates the exact form of accessibility constraint.

It is worthwhile noting that our model of inaccessibility does not distinguish between different modes of collision such as local over-cutting (e.g., gouging) and global interferences with part/fixtures. Our initial TO experiments showed that defining different collision measures and using unequal weights when penalizing them in TO show no notable improvement in the TO results. In fact, imbalanced weighting can result in tolerating one type of collision in favor of another, resulting in undesirable design artifacts.

2.2 Machining-Constrained Topology Optimization

Based on the accessibility analysis discussed in Section 1.1, we formulate the TO problem as:

$$\underset{\Omega \subseteq \Omega_0}{\text{Minimize}} \quad \varphi(\Omega), \quad (20)$$

$$\text{such that} \quad [K_\Omega][u_\Omega] = [f], \quad (21)$$

$$V_\Omega \leq V_{target}, \quad (22)$$

$$V_{\Gamma(O)} = 0, \quad (23)$$

where $\varphi(\Omega) \in \mathbb{R}$ is the value of objective function for a given design $\Omega \subseteq \Omega_0$. $[f]$, $[u_\Omega]$, and $[K_\Omega]$ are (discretized) external force vector, displacement vector, and stiffness matrix, respectively, for FEA. $V_\Omega := \text{vol}[\Omega]$ represents the design volume and $V_{target} > 0$ is the volume budget. The accessibility constraint for machining is imposed via Eq. 20(d) by asserting that the secluded $V_{\Gamma(O)} := \text{vol}[\gamma(O)]$ (i.e., volume of inaccessible regions in the negative space) must be zero. In practice, we impose a small nonzero upper-bound ~1% of part's volume) to provide relaxation against discretization errors. This initial formulation of accessibility as a 'global' constraint makes it difficult to incorporate into TO, as computing a local gradient/sensitivity for the inaccessible volume with respect to design variables is theoretically challenging, due to inherent discontinuities in collision detection, and computationally prohibitive. However, by formulating the inaccessibility as a 'local' constraint $\tilde{f}_{IMF}(x) \leq \lambda$ for all $x \in (\Omega_0 - \Omega)$, the continuous IMF can be directly augmented into the sensitivity field to filter out the inaccessible regions of the design domain.

Putting aside the accessibility constraint in eq_TOproblem_d for the moment, the more familiar constrained optimization problem of eq_TOproblem_a through eq_TOproblem_c can be expressed as minimization of the following Lagrangian:

$$\mathcal{L}_\Omega := \varphi(\Omega) + \lambda_1 \left( \frac{V_\Omega}{V_{target}} - 1 \right) + [\lambda_2]^T ([K_\Omega][u_\Omega] - [f]). \quad (24)$$

Using the prime symbol $(\cdot)'$ to represent the generic, representation-agnostic, differentiation of a function with respect to $\Omega$, we obtain (via chain rule):

$$L_\Omega, \varphi'(\Omega) + \lambda_1 \frac{V'_\Omega}{V_{target}} + [\lambda_2]^T([K_\Omega][u_\Omega])', \quad (25)$$

$$= \left(\left[\frac{\partial \varphi}{\partial u}\right] + [\lambda_2]^T[K_\Omega]\right)[u'_\Omega,] + \lambda_1 \frac{V'_\Omega}{V_{target}} + [\lambda_2]^T[K'_\Omega][u_\Omega]. \quad (23)$$

Since computing $[u'_\Omega]$ requires solving Eq. (20d) as many times as the number of design variables and is computationally prohibitive, $[\lambda_2]$ is chosen as the solution to the adjoint problem [1] which reduces Eq. (23) to:

$$\mathcal{L}'_\Omega = \lambda_1 \frac{V'_\Omega}{V_{target}} + [\lambda_2]^T[K'_\Omega][u_\Omega], \quad (24)$$

$$\text{if } [\lambda_2] := -[K_\Omega]^{-1}\left[\frac{\partial \varphi}{\partial u}\right].$$

When the objective function is the design's compliance under the applied load; namely, $\varphi = [f]^T [u_\Omega]$, we obtain $[\lambda_2] = [u_\Omega]$. This dramatically simplified the problem as the compliance is self-adjoint. There is no need for solving an additional adjoint problem unlike the case with other objective functions (e.g., stress).

To incorporate the accessibility constraint for multi-axis machining, we modify the sensitivity field $\mathcal{S}_\Omega$ as follows:

$$\mathcal{S}_\Omega := (1-w_{acc})\bar{\mathcal{S}}_\varphi + w_{acc}\bar{\mathcal{S}}_{IMF}, \quad (25)$$

where $0 \leq w_{acc} < 1$ is the filtering weight for accessibility, and can be either a constant or adaptively updated based on the secluded volume $V_{\gamma(O)}$. $\bar{\mathcal{S}}_\varphi$ is the normalized sensitivity field with respect to the objective function, i.e., only the second term $[\lambda_2]^T[K_\Omega][\Omega]$ on the right hand side of Eq. 24, noting that the volume constraint is satisfied with the optimality criteria iteration. $\bar{\mathcal{S}}_{IMF}$ is the normalized accessibility filter defined in terms of the normalized IMF as:

$$\bar{\mathcal{S}}_{IMF}(x) := \begin{cases} \bar{f}_{IMF}(x; \rho_o) & \text{if } x \in \Omega, \\ 1 & \text{if } x \in \Gamma(O), \\ 0 & \text{otherwise} \end{cases} \quad (26)$$

in which $O = (\Omega \cup F)$ and $\rho_O(x) = \rho_\Omega(x) + 1_F(x)$ represent the design and fixtures, explicitly and implicitly. $\bar{f}_{IMF}(x; \rho_o)$ is obtained from Eq. (19) (after normalization by its maximum) and $\Gamma(O) = B(O) - \Omega = B(O) \cap \Omega^c$ represents the secluded regions, which are inaccessible portions of the negative space, defined in Eq. (17). Since we are working with implicit representations, the first condition $x \in \Omega$ in eq_accFilter is computed by $1_\Omega(x) = 1$, i.e., $\rho_\Omega(x) > \tau$. The second condition $x \in \Gamma(O)$ is computed as a conjunction of $\bar{f}_{IMF} > \lambda$ (for $x \in B(O)$) and $\rho_\Omega(x) \leq \tau$ (for $x \in \Omega^c$).

The expressions in Eqs. (20) through (26) are general and representation-agnostic, and can be used in both density-based and levelset TO. To generate the results of this paper, we use the method of solid isotropic material with penalization (SIMP). The implicit design representation $\rho_\Omega : \Omega_0 \to [0,1]$ used in the definition of IMF is obtained as the projection of another field $\xi_\Omega : \Omega_0 \to [0,1]$ (smoother density field for design exploration) whose discretization $[\xi_\Omega]$ is used as SIMP design variables. We use the following Heaviside projection:

$$\rho_\Omega(x) = 1 - e^{-\beta \xi_\Omega(x)} + \xi_\Omega(x)e^{-\beta}, \quad (30)$$

We use $\beta := 2$ for 2D and $\beta := 8$ for 3D examples of Section 3. Algorithm 2 in FIG. 6 describes the accessibility-constrained TO using SIMP. The sensitive 3. Results This section presents benchmark and realistic examples in 2D and 3D. All results are generated using a SIMP implementation, where optimality criteria method was used to update the density field.

3.1. Benchmark Example: Cantilever Beam

Figure 7:
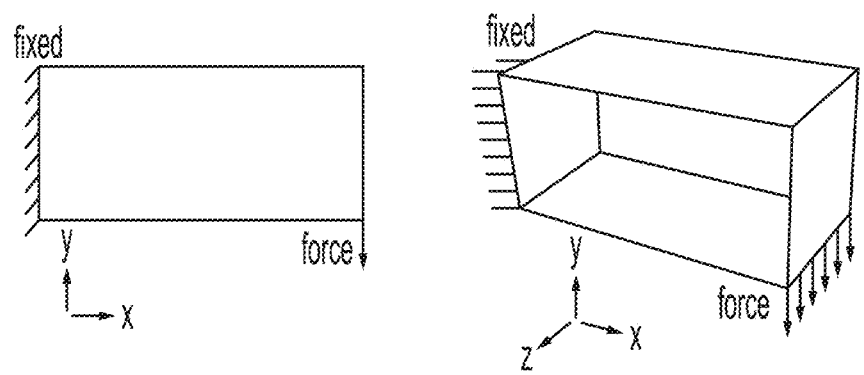
FIG. 7 is a diagram of initial design domain for cantilever beam models in 2D and 3D and loading conditions for a topology optimization procedure according to an example embodiment.

First, a simple cantilever beam is considered. In FIG. 7, a diagram shows cantilever beam boundary conditions and loading in 3D. The 2D boundary conditions and loading conditions are the same but are applied to a projection of the cantilever beam onto the xy-plane. The material properties are those of stainless steel with Young's modulus E=270 GPa and Poisson ratio v=0:3. In 2D, $V_{target}$ is 0.5 and the machining constraints are for two non-trivial cutting tools, one with a thin cutting edge and another with thicker cutting edge.

Figure 8A:
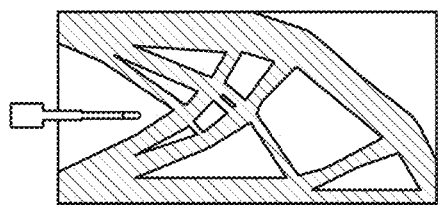
FIGS. 8A-8D are diagrams showing an optimal design, a collision free configuration, non-machinable regions and inaccessibility measure field of a cantilever according to an example embodiment.
Figure 8B:
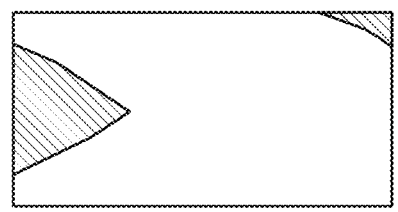
Figure 8C:
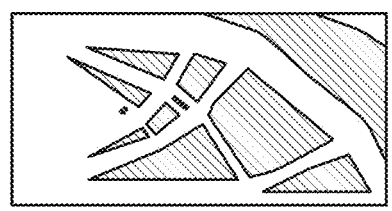
Figure 8D:
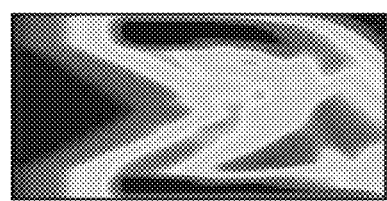
Figure 9A:
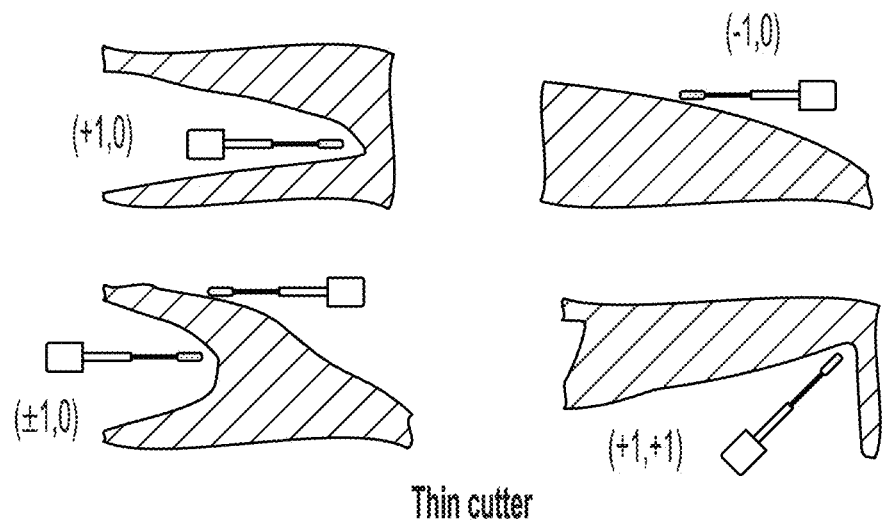
FIGS. 9A-9B are 2D model plots showing 2D machinable cantilever beam designs using given tools of different shapes at different tool orientations according to example embodiments.
Figure 9B:
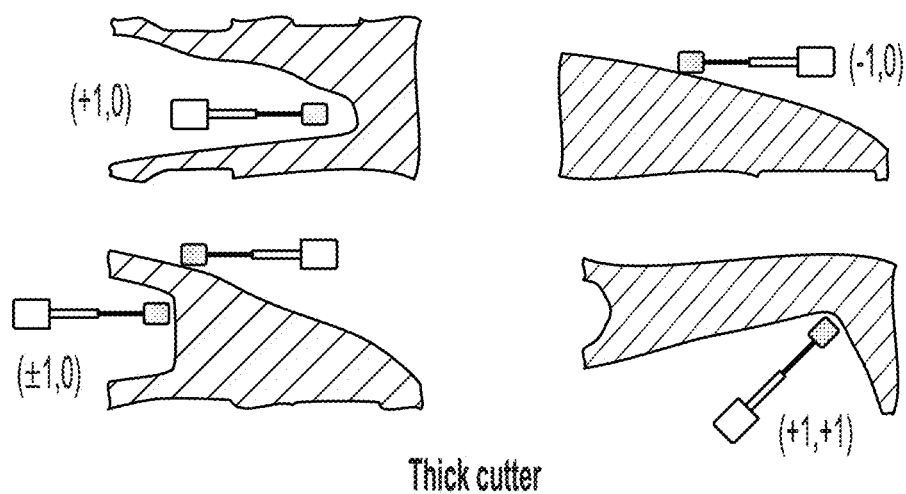
Figure 10A:
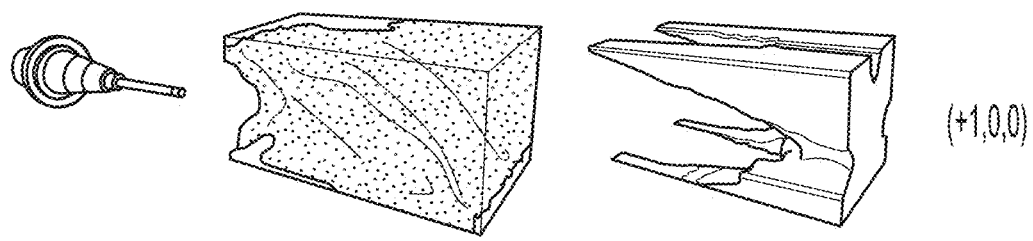
FIGS. 10A-10D are 3D model plots showing 3D machinable cantilever beam designs using a given tool at different tool orientations and combinations of orientations according to example embodiments.
Figure 10B:
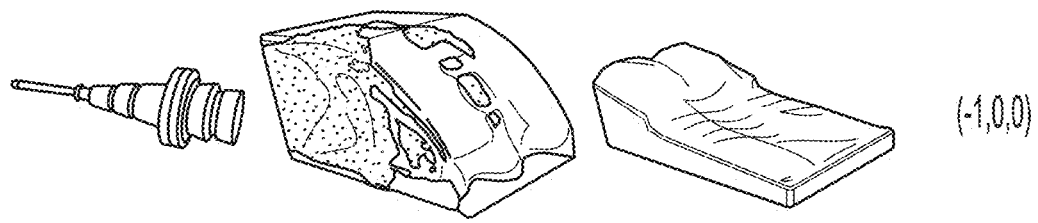
Figure 10C:
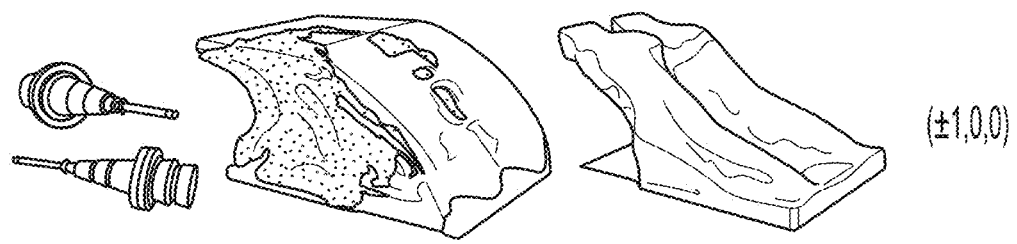
Figure 10D:
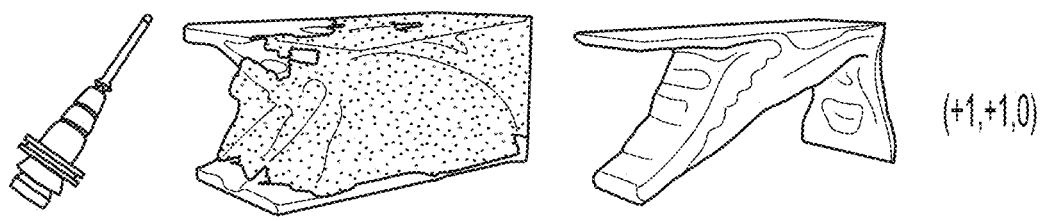

The diagrams in FIGS. 8A-8D illustrate the accessibility-unconstrained optimized cantilever beam at 0.5 volume fraction and accessibility analysis based on the cutting tool with thin cutter with (+1; 0) tool direction. Optimized design in the absence of machining constraint is shown in FIG. 8A. A set of collision-free translations of cutter are shown in FIG. 8B, secluded regions are shown in FIG. 8C, and normalized IMF is shown in FIG. 8D. The 2D outlines in FIG. 9A-9B illustrate optimized designs for different scenarios. Observe that imposing accessibility constraint prevents nucleation of interior holes in the optimized design. Further, the shape of cutter can alter the accessible region and subsequently change the final design. In FIGS. 10A-10D, 3D renderings illustrate the optimized cantilever beam at 0.3 volume fraction with milling tool approaching from different directions.

3.2. GE Bracket: 3-Axis Milling with Eye-Bolt Fixtures

Figure 11:
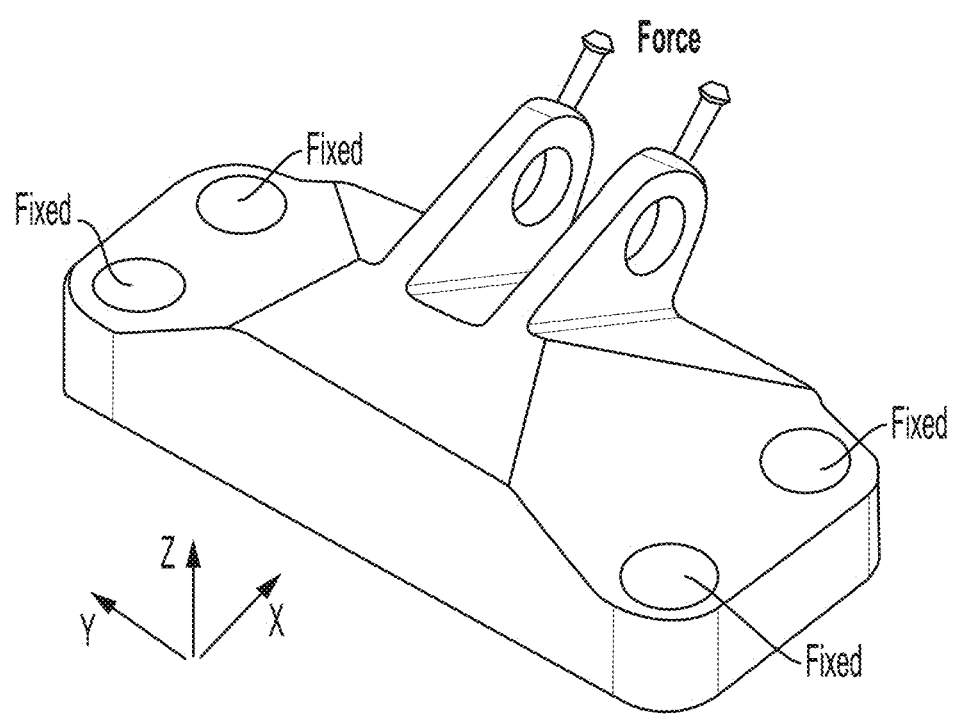
FIG. 11 is a perspective view of initial design domain for a 3D bracket and its loading condition used for demonstrating topology optimization according to an example embodiment.
Figure 12A:
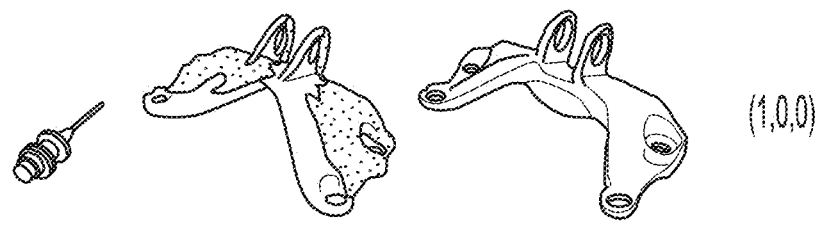
FIGS. 12A-12H are 3D model plots showing optimized, 3D machinable designs of the bracket of FIG. 7 using different tool orientations and fixture bolts according to example embodiments.
Figure 12B:
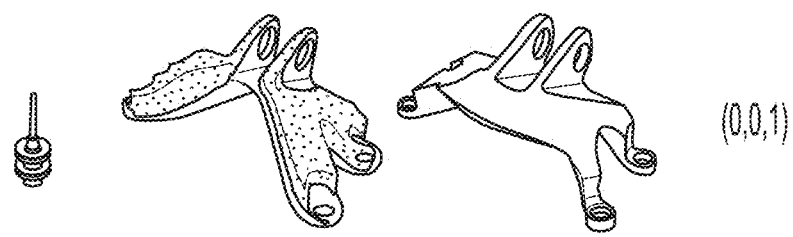
Figure 12C:
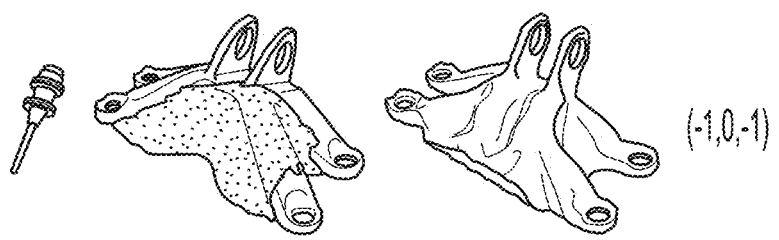
Figure 12D:
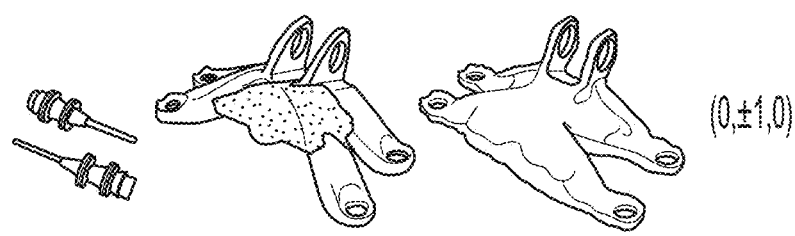
Figure 12E:
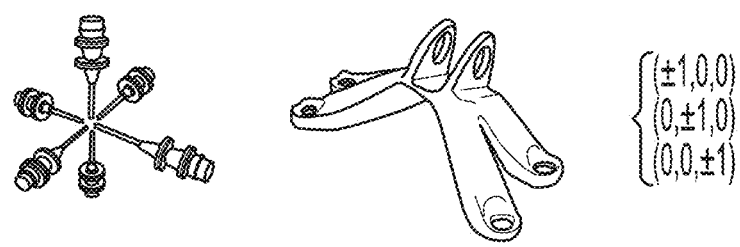
Figure 12F:
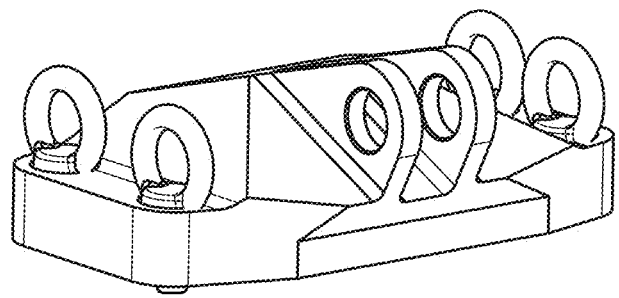
Figure 12G:
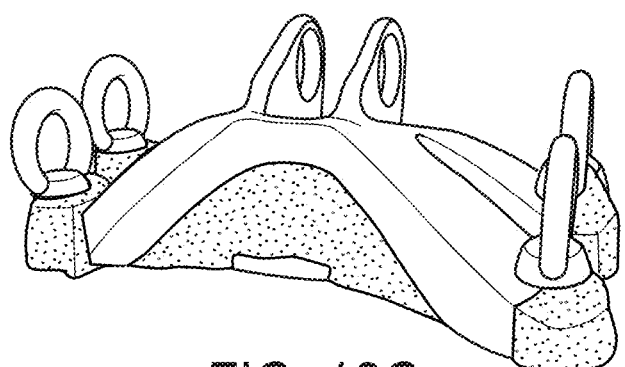
Figure 12H:
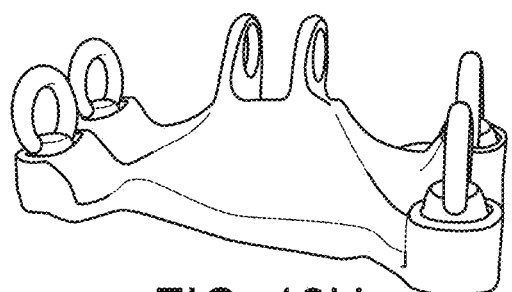

Another example involves a bracket design known as the GE bracket, which is shown in FIG. 11. Also shown in FIG. 11 are boundary conditions and loading conditions used to evaluate the design of the bracket. The material is titanium with elastic properties of E=113.8 GPa and v=0.34. The initial design domain is discretized into 100,000 hexahedral elements. The optimized design at 0:3 volume fraction is shown in FIGS. 12A-D with the milling tool approaching from different directions. It can be seen that with all six canonical directions available, the constrained part in FIG. 12E is similar to the results of TO without imposing accessibility constraints. The image in FIG. 12F shows the eyebolt fixtures that were used to constrain the design. The image in FIG. 12G shows an optimized design via accessibility-unconstrained TO with inaccessible regions for machining being shaded. The image in FIG. 12H is an optimized design via accessibility-constrained TO, machinable with specified tool and fixtures.

3.4 Benchmark Example

Figure 16:
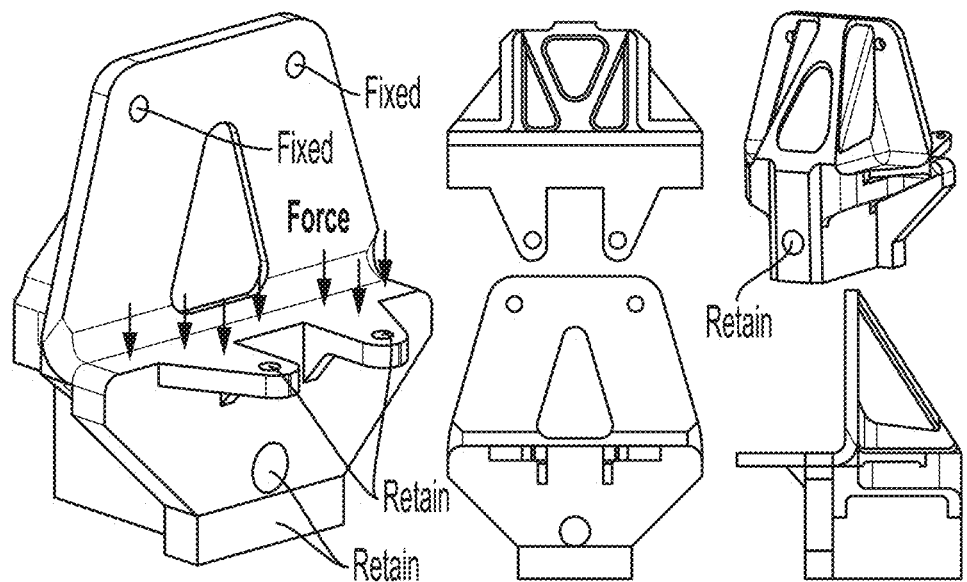
FIGS. 16 and 17 are 3D plots showing support bracket geometry, loading condition, tooling, and a fixture used to present an optimization example according to an example embodiment.

In this section, we will a realistic benchmark example in 3D. The results are generated using a SIMP implementation, where the optimality criteria method was used to update the density field. For this example, the support bracket shown in FIG. 16 was considered. The material properties are those of stainless steel with E=270 GPa and v=0:3. The underlying discretization is about 200,000 hexahedral finite elements. The target volume fraction is 0:3.

Figure 17:
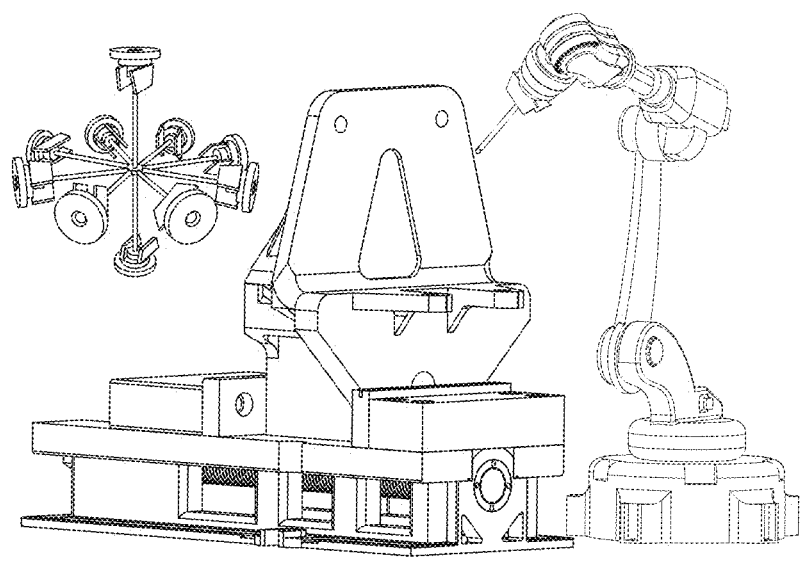

The optimized design is targeted for fabricating with a 5-axis milling robot arm and vise fixture as illustrated in FIG. 17. The highlighted components are modeled for computing IMF and rotation space is sampled at 10 orientations for the cutting tool. The discretized assembly of part and fixture used in convolution has a resolution of 196× 149×97≈1:8×106.

Figure 18:
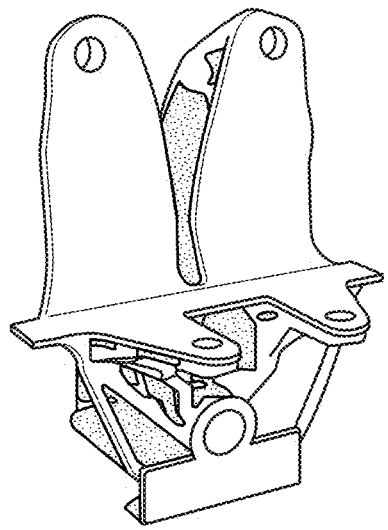
FIGS. 18 and 19 are 3D plots of optimized designs based on the brackets and fixture shown in FIGS. 16 and 17.
Figure 19:
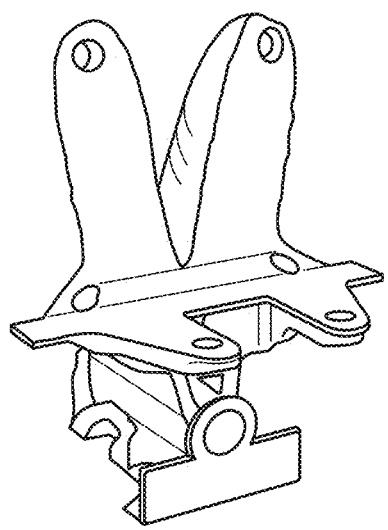

The 3D plot of FIGS. 18 and 19 illustrates the optimized designs for unconstrained and constrained cases. The secluded volume $V_{\Gamma_{unc}}$, which is volume of inaccessible regions outside the optimized design for the accessibility-unconstrained TO is about 0:18 $V_{\Omega_0}$, which is significant. To impose the accessibility constraint, we begin with $w_{acc}$=0:1 and gradually increase it to 0:5. In this example, the compliance of constrained and unconstrained designs are less than %1 different. In other words, our approach produces a machinable design with a negligible compromise in compliance.

The proposed TO framework provides a machining process plan with a given set of tool assemblies, orientations, and fixtures. Once TO comes up with a design, we employ a machining process planner to find a sequence of steps with which the negative space can be entirely removed in as few steps as possible. One algorithm is based on a greedy criterion in terms of the maximal removable volumes. Starting from the initial design domain, at each step we select the oriented tool that can machine the largest volume compared to the others, and use it to remove the subset of the negative space that is accessible to this tool at the specified orientation. We repeat this process until the entire negative space is removed.

Figure 20:
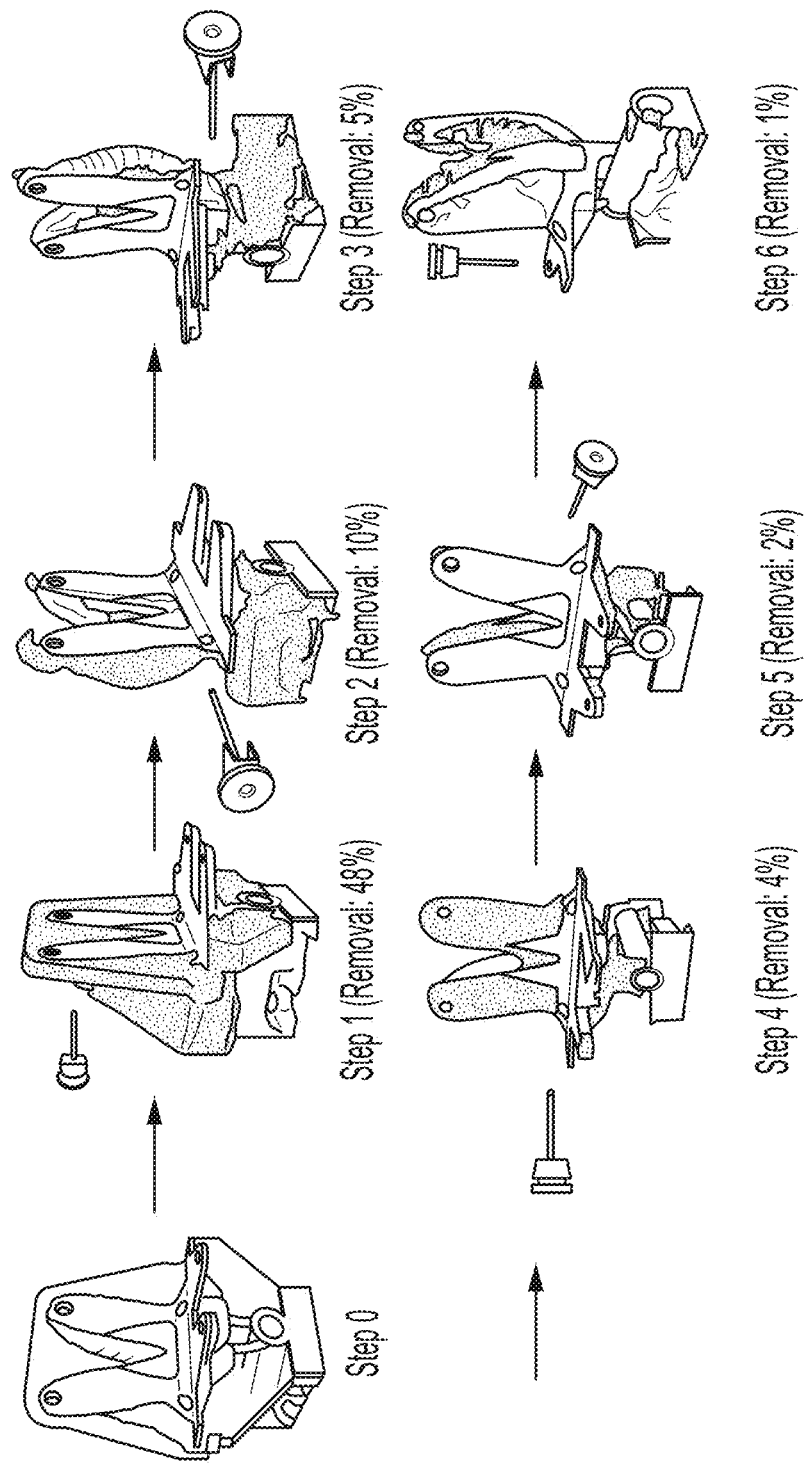
FIG. 20 is an embodiment of a process plan for forming the optimized bracket shown in FIG. 19.

The images in FIG. 20 illustrate the 6-step machining process plan to produce the accessibility-constrained optimized design at 0:3 volume fraction, starting from the initial design domain. More sophisticated combinatorial optimization algorithm and practical cost functions can be used to decide the optimal sequence of actions to be carried out by the given tools at the available orientations. In any case, having the upfront guarantee for manufacturability (e.g., existence of a process plan) and the proper set of tools and orientations is a significant assurance before proceeding to the costly task of process planning.

Figure 13:
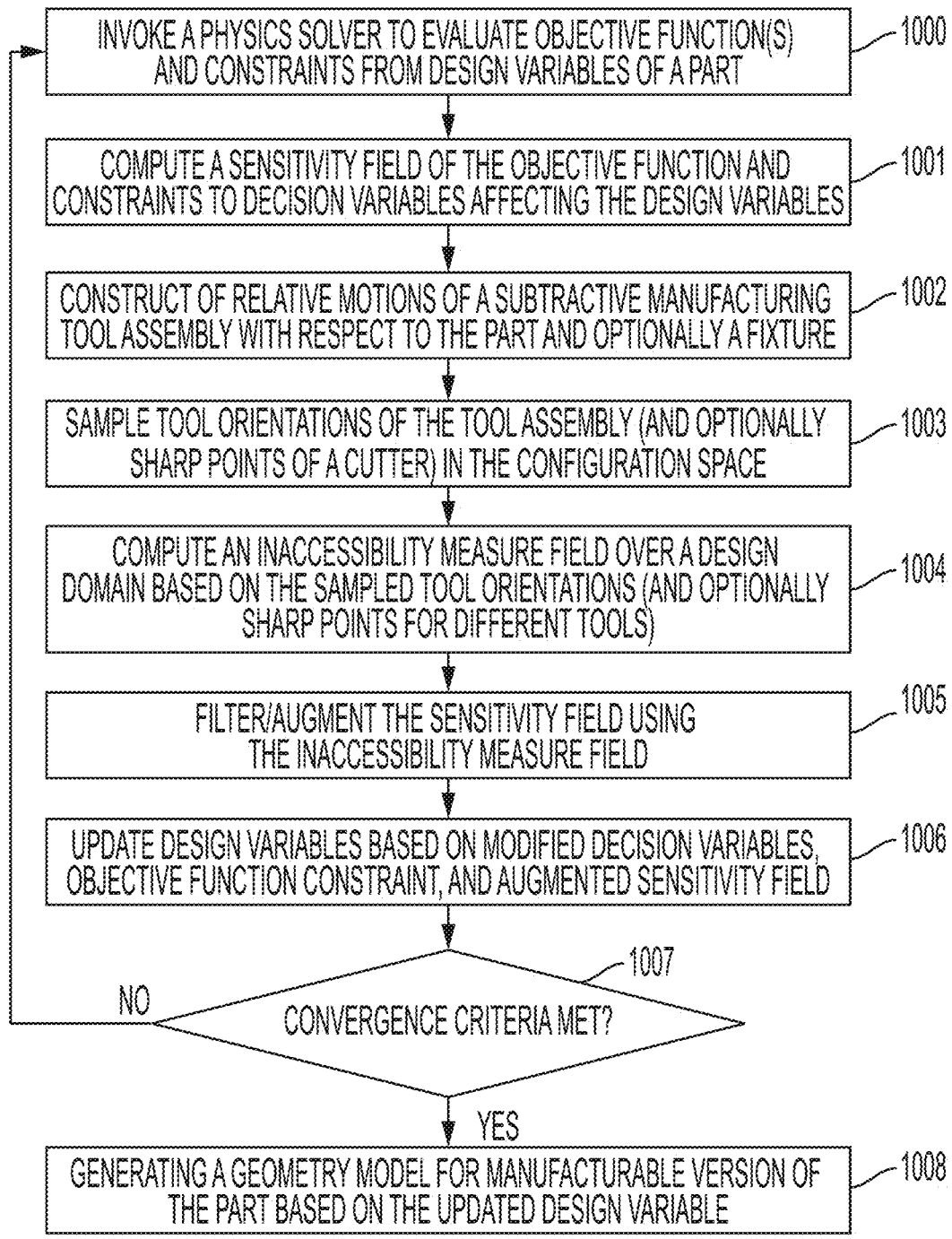
FIG. 13 is a flowchart of a method according to an example embodiment.

The methods described above are examples of a framework, method, and system to enable automatic generation of structures such that the resulting shape is guaranteed to be manufacturable using SM processes. The proposed automated design process according to an example embodiment is shown in the flowchart of FIG. 13. The process involves invoking 1000 a physics solver (e.g., finite element analysis) to evaluate objective and constraints. The optimization decision variables (e.g., gradients, sensitivity fields, etc.) are computed 1001 based on objectives and constraints. A configuration space (C-space) of the part and tool assembly are constructed 1002. Tool orientations (and optionally sharp points of a cutter of the tool) are sampled 1003 in C-space. Based on the sampling, the IMF computed 1004 and path connectedness is ensured through motion planning. The decision variables are the filtered with or augmented by 1005 the IMF, e.g., penalizing the sensitivity field over with an overall inaccessibility measure field for a plurality of tools and tool orientations. The design variables are then updated 1005 based on modified decision variables, which ultimately results in generating a manufacturable SM design.

These activities shown in FIG. 13 involve careful consideration of geometric, topological, material, and physical aspects of the available manufacturing capabilities and are best not performed in isolation. The normalized IMF field can be used to inform the automated optimization process about the inaccessible regions. In other words, the decision variables are enriched by IMF to ensure the necessary accessibility conditions are satisfied.

In one embodiment, path planners such as Open Motion Planning Library (OMPL) can be used to test for sufficient accessibility condition. The new field, coupled with IMF can be used to help optimizer generate designs that satisfy both necessary and sufficient conditions.

Figure 14:
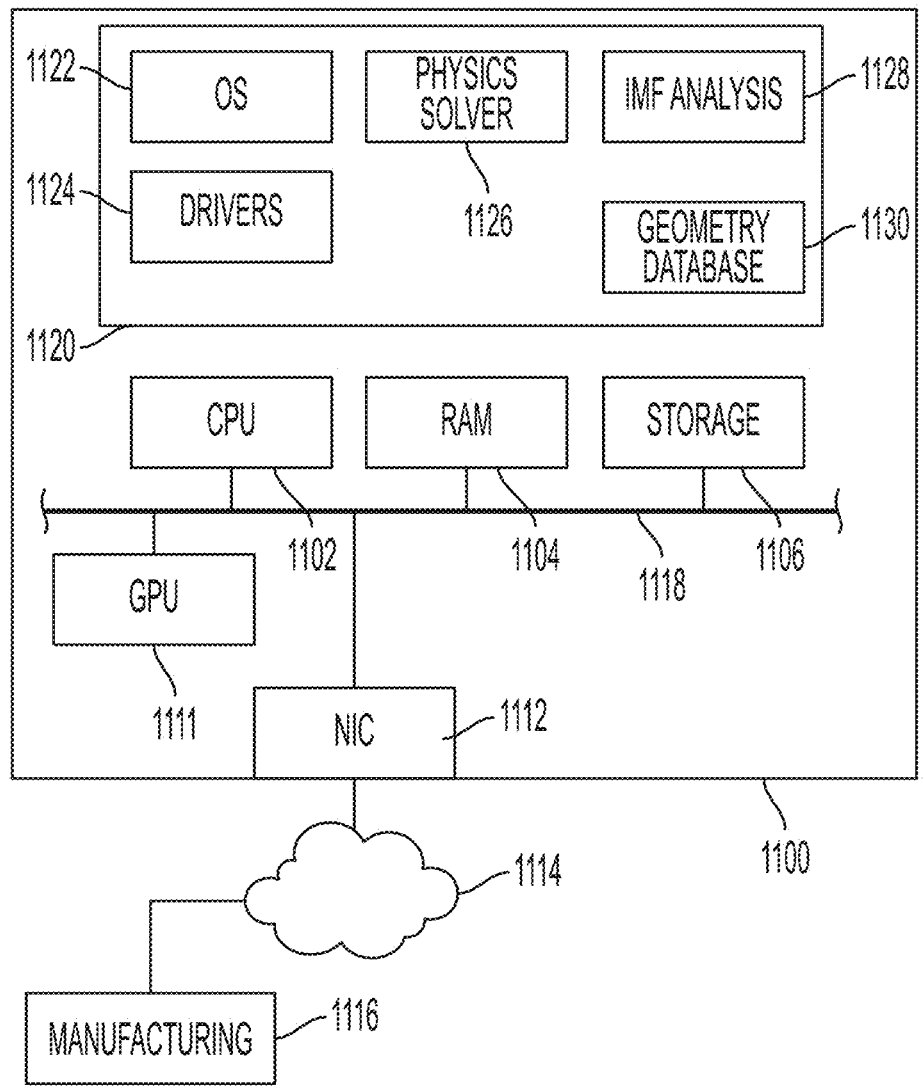
FIG. 14 is a block diagram of an apparatus according to an example embodiment.

The methods and processes described above can be implemented on computer hardware, e.g., workstations, servers, as known in the art. In FIG. 14, a block diagram shows an apparatus 1100 that may be used to implement methods according to an example embodiment. The apparatus 1100 includes one or more processors 1102 such as a central processing unit, co-processor, digital signal processor, etc. The processor 1102 is coupled to a data storage unit, which may include both random access memory 1104 and persistent storage 1106, via one or more input/output busses 1108. Other general-purpose or special-purpose hardware may be coupled to the bus 1108, such as graphics processing unit (GPU) 1111 and network interface 1112. Note that the functions of the apparatus 1100 described below may be implemented via multiple devices, e.g., via client-server arrangement, clustered computing, cloud computing, etc.

The network interface 1112 facilitates communications via a network 1114 with a manufacturing system 1116, using wired or wireless media. In addition to an HM and/or SM manufacturing machines, the manufacturing system 1116 may include pre-processors, formatters, etc., that prepare data models for use by the manufacturing machines. Data may also be transferred to the manufacturing system 1116 using non-network transport, e.g., via portable data storage drives, point-to-point communication, etc.

The apparatus 1100 includes software 1120 that facilitates optimizing geometry models for manufacture on specific SM machines. The software 1120 includes an operating system 1122 and drivers 1124 that facilitate communications between user-level programs and the hardware. The software 1120 may also include a physics solver 1126 that predicts performance of manufactured parts. The physics solver 1126 may utilize any numerical physics solver including but not limited to finite element analysis (e.g., to predict stress, deflection, vibration response), finite difference analysis (to predict heat transfer performance), finite volume analysis, common in computational fluid dynamics (e.g., to predict turbulence, back pressure), spectral analysis, etc. The physics solver 1126 will generally represent geometry of the analyzed parts, and this geometry may be stored locally or remotely as indicated generically by geometry database 1130.

An IMF analysis module 1128 analyses part and tool geometry (e.g., obtainable via geometry database 1130) and determines regions of the part that are inaccessible by one or more tool SM assemblies. Generally, the module 1128 calculates the inaccessibility measure field (IMF) based on geometry of a subtractive tool assembly (e.g., milling machines, saws, sanders/grinders, laser cutters, water jet cutters, electrical discharge machines), for a given geometry of raw stock, and a given part design geometry. The inaccessibility measure includes a continuous, real-valued field that indicates regions that cannot be accessed by the subtractive tool assembly. The module 1128 modifies the part design geometry based on the inaccessibility measure to obtain a manufacturable part design geometry. Generally, this enables producing a part using the manufacturing system 1116 based on the manufacturable part design geometry using the machining tool assembly, because the part would otherwise be non-manufacturable.

Figure 15:
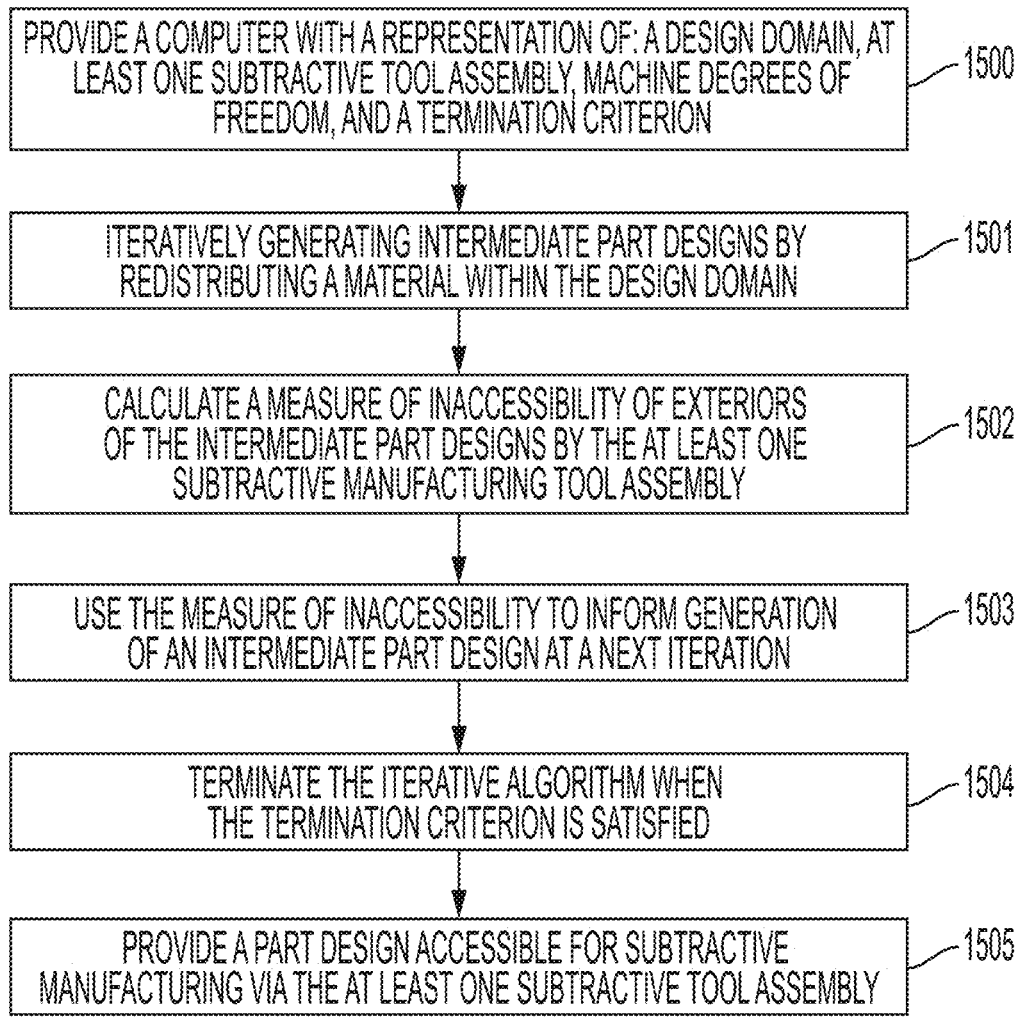
FIG. 15 is a flowchart of a method according to an example embodiment.

In FIG. 15, a flowchart illustrates a method according to an example embodiment. The method involves providing 1500 a computer with a representation of: a design domain, at least one subtractive tool assembly, machine degrees of freedom, and a termination criterion. Intermediate part designs are iteratively generated 1501 by redistributing a material within the design domain. A measure of inaccessibility of exteriors of the intermediate part designs by the at least one subtractive manufacturing tool assembly is calculated. The measure of inaccessibility is used 1503 to inform generation of an intermediate part design at a next iteration. The iterative algorithm is terminated 1504 when the termination criterion is satisfied. The result is that the iterative algorithm provides 1505 a part design accessible for subtractive manufacturing via the at least one subtractive tool assembly.

In summary, methods and systems described above can automatically optimize a shape to meet multiple physical performance criteria while ensuring that resulting shape satisfies the necessary accessibility condition to be manufacturable by SM processes such as multi-axis machining. The shape can be made to shape to satisfy necessary accessibility conditions by adding inaccessible regions of the raw stock determined by Equation (7) either in an optimization loop or as a post-processing stage. A method and system can store the accessibility information of a set of tool, orientations, and fixtures in the optimization loop, as well as providing the accessibility information on demand to a user.

A semi-automated approach may involve an automated design tool generating design and accessible configurations for each of the available tools such that human engineer devises a cost-effective manufacturing plan, while collision-free tool motions are automatically ensured regardless of the order in which the tools are used. This may also be used for hybrid manufacturing (see, e.g., U.S. patent application Ser. No. 15/858,677 filed Dec. 29, 2017) and support removal process planning (see, e.g., U.S. Pat. No. 10,359,764). A fully-automated approach to SM process planning may involve an automated design tool generating designs and accessible configurations for each of the available tools, which guarantee the existence of at least one SM process plan to produce the part with the given set of tools, orientations, etc., and a manufacturing planning algorithm that devises a cost-optimal manufacturing plan.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A method comprising:
   providing a computer with a representation of: a design domain, at least one subtractive tool assembly, machine degrees of freedom, and a termination criterion;
   performing an iterative algorithm to iteratively generate intermediate part designs by redistributing a material within the design domain;
   calculating a measure of inaccessibility of exteriors of the intermediate part designs by the at least one subtractive tool assembly, the measure of inaccessibility defined over a design volume and being used to inform generation of an intermediate part design at a next iteration, wherein the measure of inaccessibility comprises a continuous spatial field that quantifies to what extent different points in the design domain cannot be accessed by the at least one subtractive tool assembly, wherein the continuous spatial field comprises a point-wise minimum of shifted convolutions of a sharp point of the at least one subtractive tool assembly and all available orientations of the at least one subtractive tool assembly; and
   terminating the iterative algorithm when the termination criterion is satisfied, a result of the iterative algorithm being a part design accessible for subtractive manufacturing via the at least one subtractive tool assembly.

2. The method of claim 1, wherein the computer is provided with a physics-based performance criterion, and the redistribution of material to generate the intermediate part designs is performed to optimize for the physics-based performance criterion while satisfying accessibility.

3. The method of claim 2, wherein the redistribution of the material to generate the intermediate part designs is calculated by removing regions with a least effect on the physics-based performance criterion, penalized by the measure of inaccessibility.

4. The method of claim 3, wherein the measure of inaccessibility is employed to penalize a sensitivity of physics-based performance criterion with respect to material distribution.

5. The method of claim 1, wherein the subtractive tool assembly comprises a multi-axis machining tool.

6. The method of claim 5, wherein the multi-axis machine tool comprises one of 2-axis turning machine, 3-axis milling machine, 5-axis turn-milling machine, sawing machine, wire-cutting machine, and laser-cutting machine.

7. The method of claim 1, wherein the continuous spatial field for a plurality of subtractive tool assemblies is calculated as a minimum of inaccessibility measure fields for individual tool assemblies.

8. The method of claim 7, wherein the minimum of the inaccessibility measure fields for the individual tool assemblies at every query point of the design domain is calculated as a minimum of the measure of inaccessibility for different configurations at which the query point can be removed by the individual tool assemblies.

9. The method of claim 8, wherein the different configurations over which the minimum is calculated comprise at least one of displacements that bring the sharp point on the tool in contact with the query point, and all orientations that are available to the tool assembly.

10. The method of claim 8, wherein the inaccessibility measure is defined by a volume of collision between the tool assembly and the intermediate part design.

11. The method of claim 1, wherein the computer is provided with representations of at least one fixture for the subtractive manufacturing.

12. The method of claim 11, wherein the inaccessibility measure is defined by a volume of collision between the tool assembly, the intermediate part design, and the at least one fixture, the volume of collision defined over all available orientations of the tool assembly.

13. A system comprising:
a data storage unit storing a representation of: a design domain, at least one subtractive tool assembly, machine degrees of freedom, and a termination criterion; and
a processor coupled to the data storage unit and configured to:
perform an iterative algorithm to iteratively generate intermediate part designs by redistributing a material within the design domain;
calculate a measure of inaccessibility of exteriors of the intermediate part designs by the at least one subtractive tool assembly, the measure of inaccessibility defined over a design volume and being used to inform generation of an intermediate part design at a next iteration, wherein the measure of inaccessibility comprises a continuous spatial field that quantifies to what extent different points in the design domain cannot be accessed by the at least one subtractive tool assembly, wherein the continuous spatial field comprises a pointwise minimum of shifted convolutions of a sharp point of the at least one subtractive tool assembly and available orientations of the at least one subtractive tool assembly;
terminate the iterative algorithm when the termination criterion is satisfied, a result of the iterative algorithm being a part design accessible for subtractive manufacturing via the at least one subtractive tool assembly.

14. The system of claim 13, wherein the processor is provided with a physics-based performance criterion, and the redistribution of material to generate the intermediate part designs is performed to optimize for the physics-based performance criterion while satisfying accessibility.

15. The system of claim 14, wherein the redistribution of material to generate the intermediate part designs is calculated by removing regions with a least effect on the physics-based performance criterion, penalized by the measure of inaccessibility.

16. The system of claim 15, wherein the measure of inaccessibility is employed to penalize a sensitivity of the physics-based performance criterion with respect to material distribution.

17. The system of claim 13, wherein the continuous spatial field for a plurality of subtractive tool assemblies is calculated as a minimum of inaccessibility measure fields for individual tool assemblies, and wherein the minimum of the inaccessibility measure fields for the individual tool assemblies at every query point of the design domain is calculated as a minimum of the measure of inaccessibility for different configurations at which the query point can be removed by the tool.

18. The system of claim 17, wherein the configurations over which the minimum is calculated comprise at least one of displacements that bring the sharp point on the tool in contact with the query point, and all orientations that are available to the tool assembly.

19. The system of claim 17, wherein the inaccessibility measure is defined by a volume of collision between the tool assembly and the intermediate part design, the volume of collision defined over all available orientations of the tool assembly.

* * * * *